(12) United States Patent
Kobayashi et al.

(10) Patent No.: US 9,836,181 B2
(45) Date of Patent: *Dec. 5, 2017

(54) WIDGET CONTROL OF AN ELECTRONIC DEVICE

(71) Applicant: KYOCERA Corporation, Kyoto-shi, Kyoto (JP)

(72) Inventors: Hiroki Kobayashi, Osaka (JP); Satoshi Asano, Itami (JP)

(73) Assignee: KYOCERA Corporation, Kyoto (JP)

( * ) Notice: Subject to any disclaimer, the term of this patent is extended or adjusted under 35 U.S.C. 154(b) by 220 days.

This patent is subject to a terminal disclaimer.

(21) Appl. No.: 14/618,906

(22) Filed: Feb. 10, 2015

(65) Prior Publication Data
US 2015/0153908 A1    Jun. 4, 2015

Related U.S. Application Data

(63) Continuation of application No. PCT/JP2013/071299, filed on Aug. 7, 2013.

(30) Foreign Application Priority Data

Aug. 10, 2012 (JP) ................................. 2012-178142

(51) Int. Cl.
*G06F 3/0481* (2013.01)
*G06F 9/44* (2006.01)
(Continued)

(52) U.S. Cl.
CPC .......... *G06F 3/0481* (2013.01); *G06F 9/4443* (2013.01); *H04M 1/00* (2013.01); *H04M 1/236* (2013.01)

(58) Field of Classification Search
None
See application file for complete search history.

(56) References Cited

U.S. PATENT DOCUMENTS 7,599,683 B2   10/2009   Kaida
7,738,893 B2    6/2010   Lim
(Continued)

FOREIGN PATENT DOCUMENTS

CN   WO 2011134406 A1 * 11/2011 ......... G06F 3/04817
JP   2006-042355 A     2/2006
(Continued)

OTHER PUBLICATIONS

AndroidDevelopers, Widget Design Guidelines, 2011, retrieved from <<http://developer.android.com/guide/practices/ui_guidelines/widget_design.html>>, Accessed Jun. 2, 2016.*
(Continued)

*Primary Examiner* — Michael J Cobb
(74) *Attorney, Agent, or Firm* — Procopio Cory Hargreaves and Savitch LLP

(57) ABSTRACT

An electronic device comprises an executing module, a display module, and a display controller. The display controller makes the display module display a first display screen containing information about execution of a certain function during execution. The executing module starts execution of a widget for making the display module display information included in the first display screen while the certain function is executed and thereafter when execution of the certain function is finished, the executing module finishes execution of the widget When the display controller makes the display module display a display screen different from the first display screen while the widget is executed, the display controller incorporates widget execution information into a partial region of the different display screen based on execution of the widget. The widget execution information includes at least part of the information on the first display screen.

14 Claims, 15 Drawing Sheets

(51) Int. Cl.
*H04M 1/00* (2006.01)
*H04M 1/23* (2006.01)

(56) References Cited

U.S. PATENT DOCUMENTS

| | | | |
|---|---|---|---|
| 2006/0171528 A1* | 8/2006 | Kaida | H04W 84/08 379/406.08 |
| 2008/0195961 A1* | 8/2008 | Bae | G06F 3/0481 715/769 |
| 2009/0249247 A1* | 10/2009 | Tseng | G06F 3/0481 715/808 |
| 2010/0257196 A1* | 10/2010 | Waters | G06F 3/0481 707/769 |
| 2010/0295789 A1* | 11/2010 | Shin | G06F 1/1626 345/168 |
| 2012/0159386 A1* | 6/2012 | Kang | G06F 3/0481 715/800 |
| 2013/0055124 A1* | 2/2013 | Wang | G06F 3/04817 715/765 |
| 2013/0084920 A1* | 4/2013 | Sawhney | G06F 3/04883 455/566 |
| 2013/0109426 A1* | 5/2013 | Kerger | H04L 65/4061 455/518 |
| 2013/0176328 A1* | 7/2013 | Pillai | G01C 21/3632 345/592 |
| 2013/0215088 A1* | 8/2013 | Son | G09G 5/40 345/204 |
| 2013/0302008 A1* | 11/2013 | Kwon | H04N 21/414 386/230 |

FOREIGN PATENT DOCUMENTS

| | | | | |
|---|---|---|---|---|
| JP | 2006042355 A | * | 2/2006 | H04W 84/08 |
| JP | 2006-135500 A | | 5/2006 | |
| JP | 2006-180143 A | | 7/2006 | |
| JP | 2006180143 A | * | 7/2006 | H04W 84/08 |
| JP | 2011-243133 A | | 12/2011 | |
| KR | EP 1622408 A1 | * | 2/2006 | H04W 84/08 |

OTHER PUBLICATIONS

AndroidDevelopers, Notifications, 2012, retrieved from <<http://developer.android.com/guide/topics/ui/notifiers/index.html>>, Accessed Jun. 2, 2016.*
AndroidDevelopers, App Components, 2012, retrieved from <<http://developer.android.com/guide/components/index.html>>, Accessed Jun. 2, 2016.*
Office Action dated Jan. 17, 2017 issued by the Japan Patent Office in Counterpart Japanese Application No. 2016-052316.
International Search Report and Written opinion of the International Searching authority for counterpart international application No. pct/jp2013/071299.
android-smart.com, "List Notifier Widget Lite which Enables Quick Confirmation by Displaying Notifications on Home Screen instead of Status Bar", an English translation of "Status Bar no Kawari ni Home Gamen ni Tsuchi o Hyoji shite Subayaku Kakunin Dekiru List Notifier Widget Lite", Nov. 11, 2011.

* cited by examiner

F I G . 4
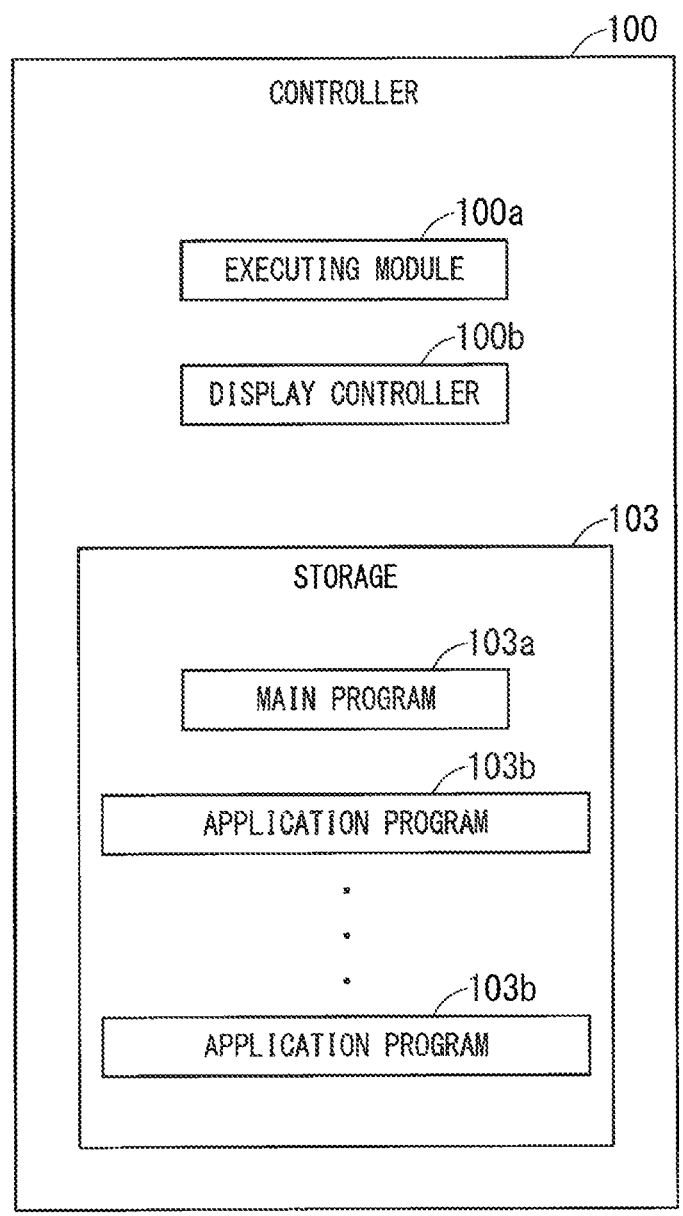

F I G. 5
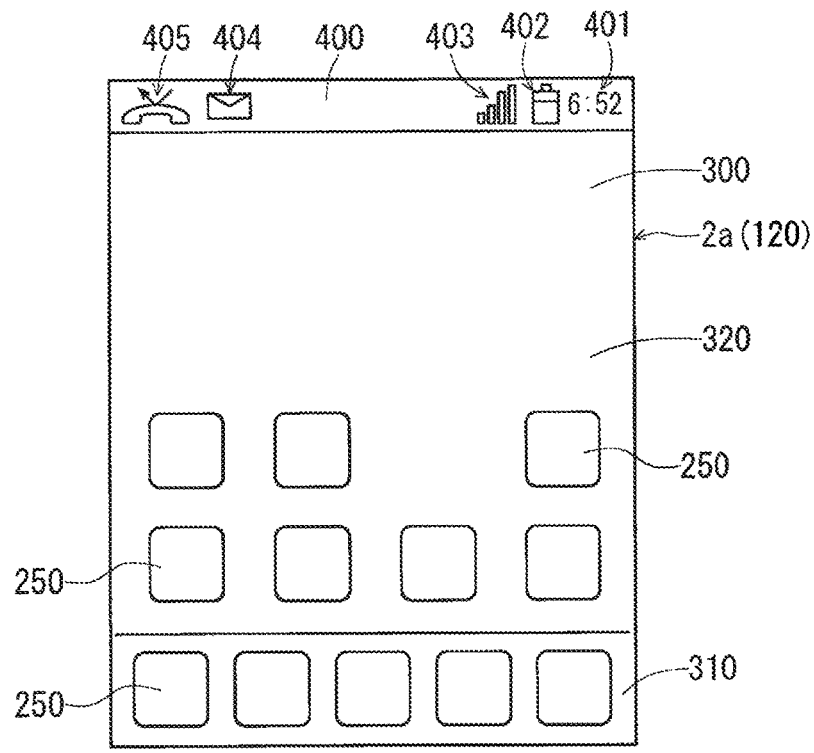
F I G. 6
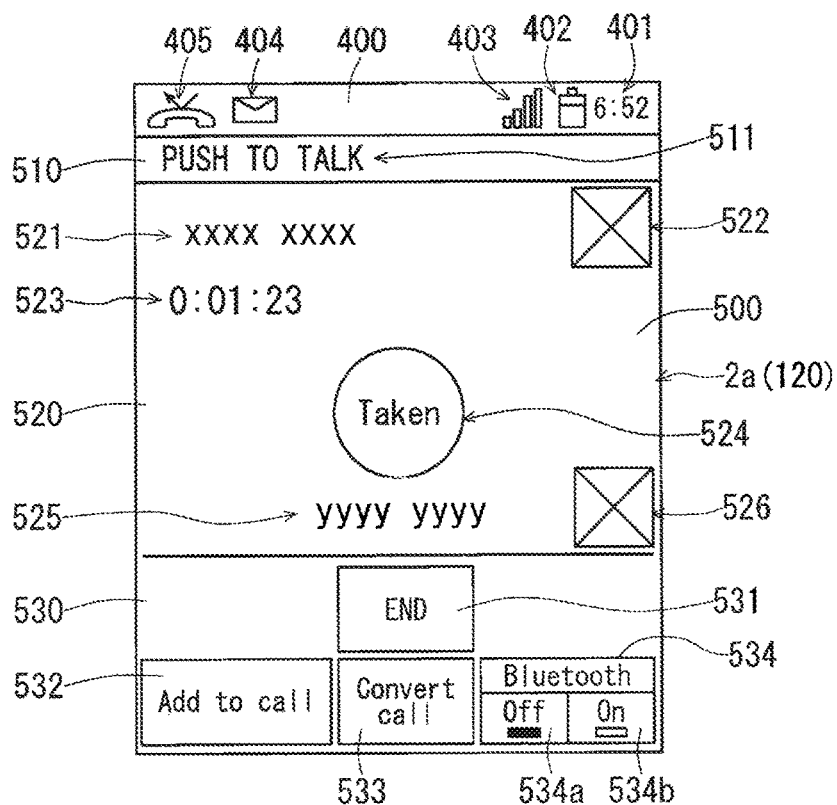

F I G . 9
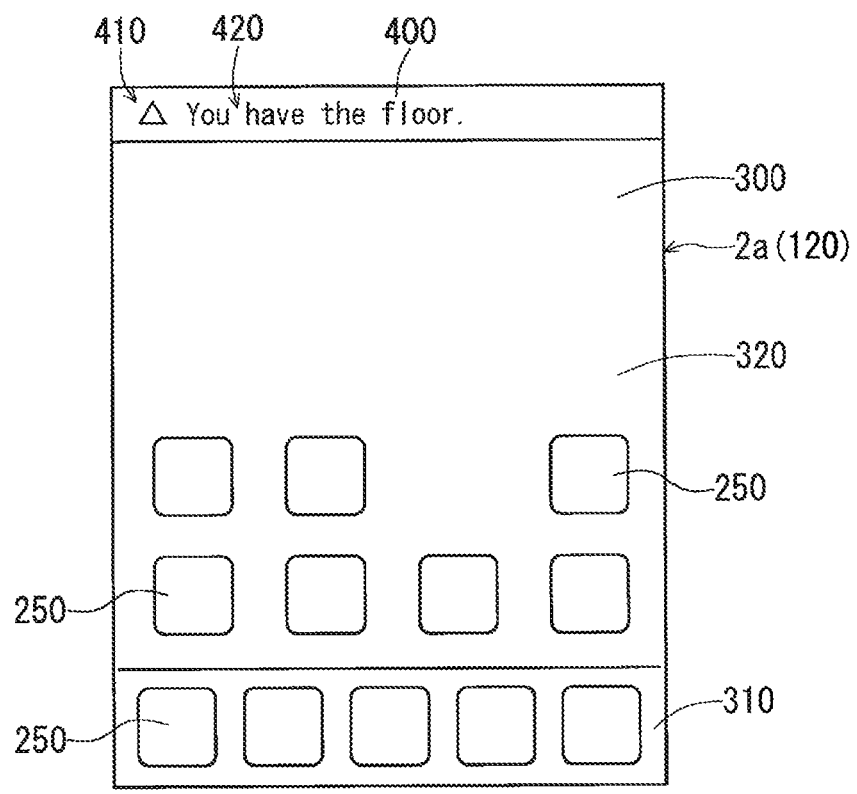

F I G. 1 0
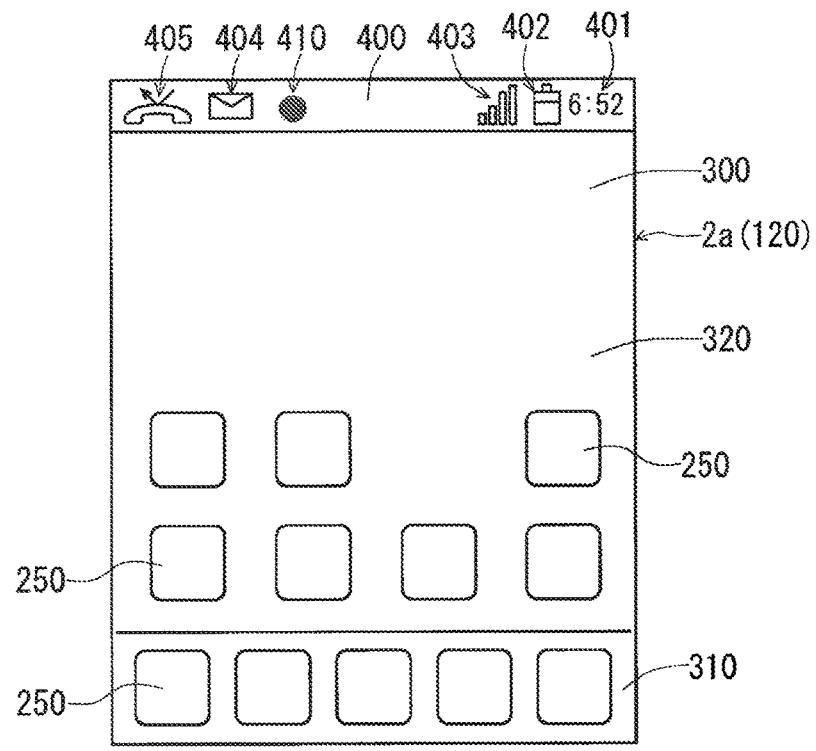
F I G. 1 1
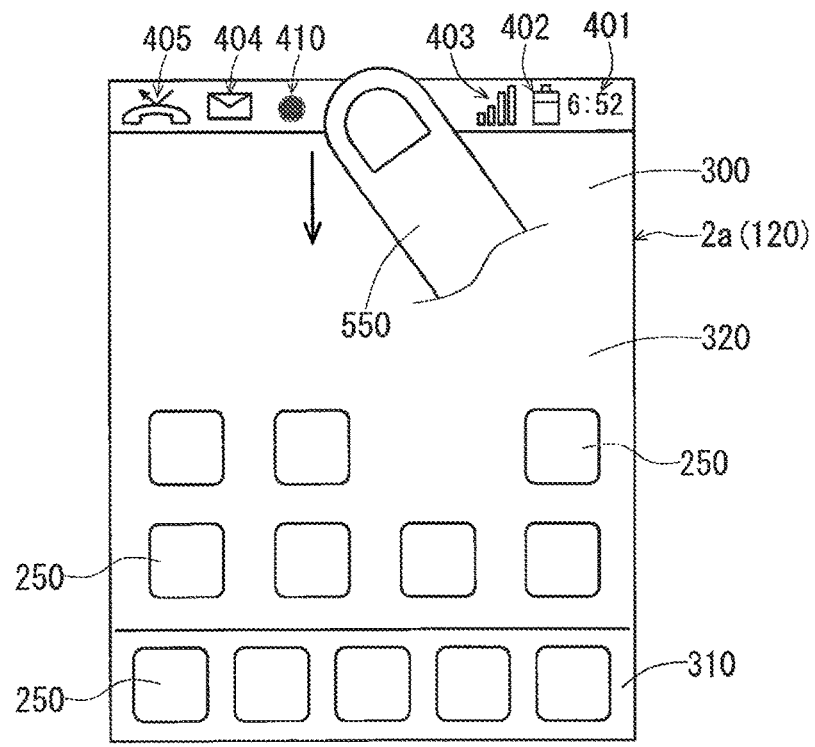

WIDGET CONTROL OF AN ELECTRONIC DEVICE

The present application is a bypass continuation of international application PCT Application No. PCT/JP2013/071299, filed on Aug. 7, 2013, entitled "ELECTRONIC DEVICE AND CONTROL PROGRAM, AND METHOD FOR EXECUTING PROCESSES IN ELECTRONIC DEVICE", which claims the benefit of Japanese Application No. 2012-178142, filed on Aug. 10, 2012, entitled "ELECTRONIC DEVICE AND CONTROL PROGRAM, AND METHOD FOR EXECUTING PROCESSES IN ELECTRONIC DEVICE". The contents of which are incorporated by reference herein in their entirety.

FIELD

Embodiments of the present disclosure relate to an electronic device.

BACKGROUND

Various techniques have conventionally been suggested relating to an electronic device.

SUMMARY

A device, a recording medium and a method are disclosed. In one embodiment, an electronic device comprises an executing module configured to execute a program, a display module configured to display information and a display controller configured to control the display module. The display controller makes the display module display a first display screen containing information about execution of a certain function while the electronic device executes the certain function. The executing module starts execution of a widget for making the display module display information included the first display screen while the certain function is executed and thereafter when execution of the certain function is finished, the executing module finishes execution of the widget. When the display controller makes the display module display a display screen different from the first display screen while the widget is executed, the display controller incorporates widget execution information into a partial region of the different display screen based on execution of the widget. The widget execution information includes at least part of the information on the first display screen.

In one embodiment, a non-transitory computer-readable recording medium is configured to store a control program configured to control an electronic device. The control program is configured to make the electronic device execute a steps of (a) displaying a first display screen containing information about a certain function while the certain function is executed, (b) starting execution of a widget for displaying information included in the first display screen while the certain function is executed and thereafter when execution of the certain function is finished, finishing execution of the widget, and (c) incorporating widget execution information into a partial region of a display screen different from the first display screen based on execution of the widget when the different display screen is displayed while the widget is executed. The widget execution information includes at least part of the information on the first display screen.

In one embodiment, a method of performing process at an electronic device comprises a steps of (a) displaying a first display screen containing information about a certain function while the certain function is executed, (b) starting execution of a widget for displaying information included the first display screen while the certain function is executed and thereafter when execution of the certain function is finished, finishing execution of the widget, and (c) incorporating widget execution information into a partial region of a display screen different from the first display screen based on execution of the widget when the different display screen is displayed while the widget is executed. The widget execution information includes at least part of the information on the first display screen.

BRIEF DESCRIPTION OF DRAWINGS

FIG. 4 illustrates a block diagram showing the structure of a part of a controller of the electronic device.

FIG. 5 illustrates an exemplary display screen displayed on the electronic device.

FIG. 6 illustrates an exemplary display screen displayed on the electronic device.

FIG. 9 illustrates an exemplary display screen displayed on the electronic device.

FIG. 10 illustrates an exemplary display screen displayed on the electronic device.

FIG. 11 illustrates how a user operates a display region of the electronic device.

DETAILED DESCRIPTION

First Embodiment

Appearance of Electronic Device

Figure 1:
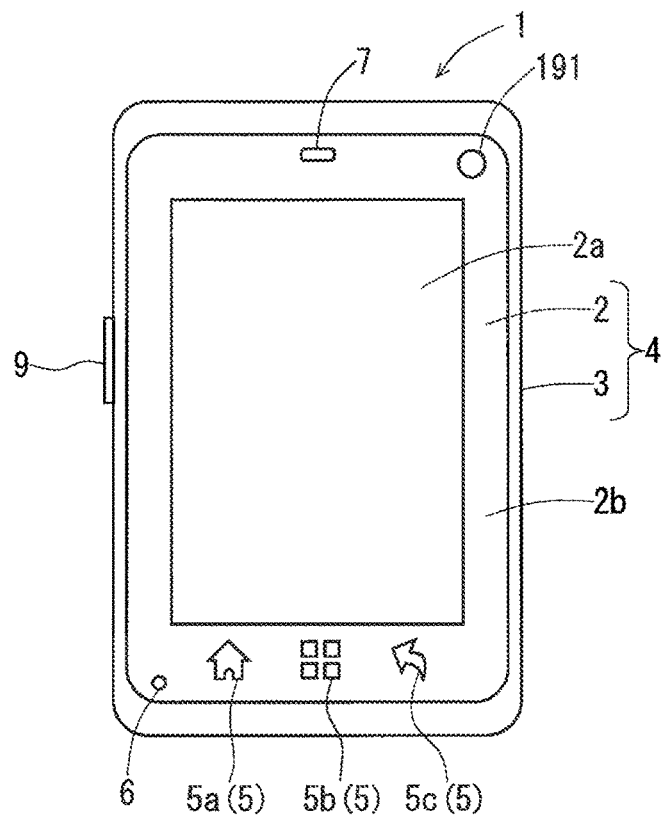
FIG. 1 illustrates a front view showing the appearance of an electronic device.
Figure 2:
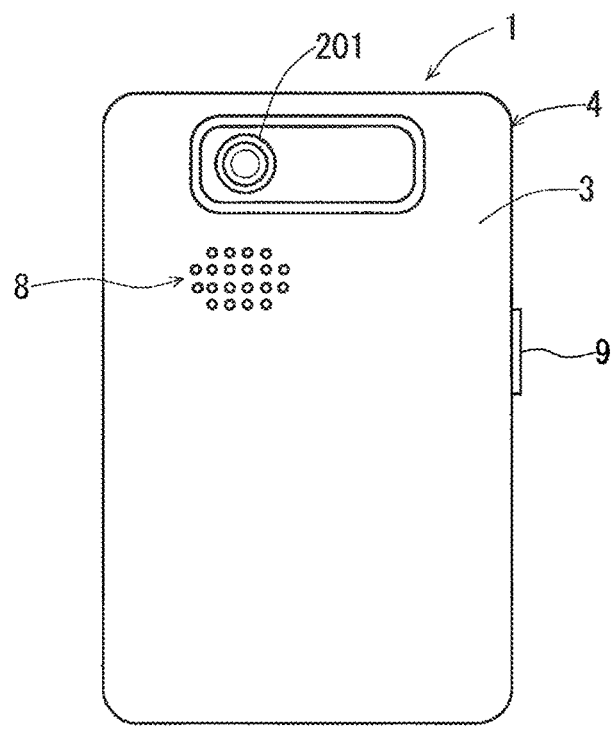
FIG. 2 illustrates a back view showing the appearance of the electronic device.

FIGS. 1 and 2 are a front view and a back view respectively showing the appearance of an electronic device 1 of a first embodiment. The electronic device 1 of this embodiment is for example a mobile phone and is capable of communicating with a different communication device via a base station, a server and the like. As shown in FIGS. 1 and 2, the electronic device 1 includes a cover panel 2 and a case part 3. The cover panel 2 and the case part 3 are assembled to form a device case 4 having a substantially rectangular plate shape in a plan view.

The cover panel 2 is substantially rectangular in a plan view. The cover panel 2 forms a part of the front of the electronic device 1 other than a peripheral portion thereof. The cover panel 2 is made of transparent glass or transparent acrylic resin, for example. The case part 3 forms the peripheral portion of the front, the side, and the back of the electronic device 1. The case part 3 is made of polycarbonate resin, for example.

A display region 2a in which various information including characters, symbols, and figures are displayed is formed in the front of the cover panel 2. The display region 2a is rectangular in a plan view, for example. A peripheral part 2b of the cover panel 2 surrounding the display region 2a is blackened by being covered with a film, for example. Thus, the peripheral part 2b becomes a non-display part where no information is displayed. A touch panel 130 described later is affixed to the back of the cover panel 2. A user can give various instructions to the electronic device 1 by operating the display region 2a in the front of the electronic device 1 for example with a finger. The user can also give various instructions to the electronic device 1 by operating the display region 2a with a contact part other than a finger such as a pen for a capacitive touch panel such as a stylus pen.

A home key 5a, a menu key 5b, and a back key 5c are provided in the device case 4. Each of the home key 5a, the menu key 5b, and the back key 5c is a hardware key and has a surface exposed from the lower end of the front of the cover panel 2. The home key 5a is an operation key to be operated for displaying a home screen described later in the display region 2a. The menu key 5b is an operation key to be operated for displaying an option menu screen. The back key 5c is an operation key to be operated for making display in the display region 2a return to the last display. When there is no particular reason for distinguishing the home key 5a, the menu key 5b, and the back key 5c, each of these keys will be called an "operation key 5." Each of the home key 5a, the menu key 5b, and the back key 5c is not always required to be a hardware key but it may also be a software key which is displayed in the display region 2a and a software key on which the operation performed is detected in the touch panel 130.

A push-to-talk button 9 (hereinafter called a "PTT button 9") is provided in the device case 4. The electronic device 1 of this embodiment is capable of making conversation using push to talk. A user can transmit the voice of the user himself or herself to a conversation partner by pressing the PTT button 9 while speaking.

A microphone hole 6 is formed in the lower end of the cover panel 2. A receiver hole 7 is formed in the upper end of the cover panel 2. An imaging lens 191 of a front imaging module 190 described later is visible via the upper end of the front of the cover panel 2. As shown in FIG. 2, speaker holes 8 are formed in the back of the electronic device 1, namely, in the back of the device case 4. An imaging lens 201 of a back imaging module 200 described later is visible via the back of the electronic device 1.

<Electrical Structure of Electronic Device>

Figure 3:
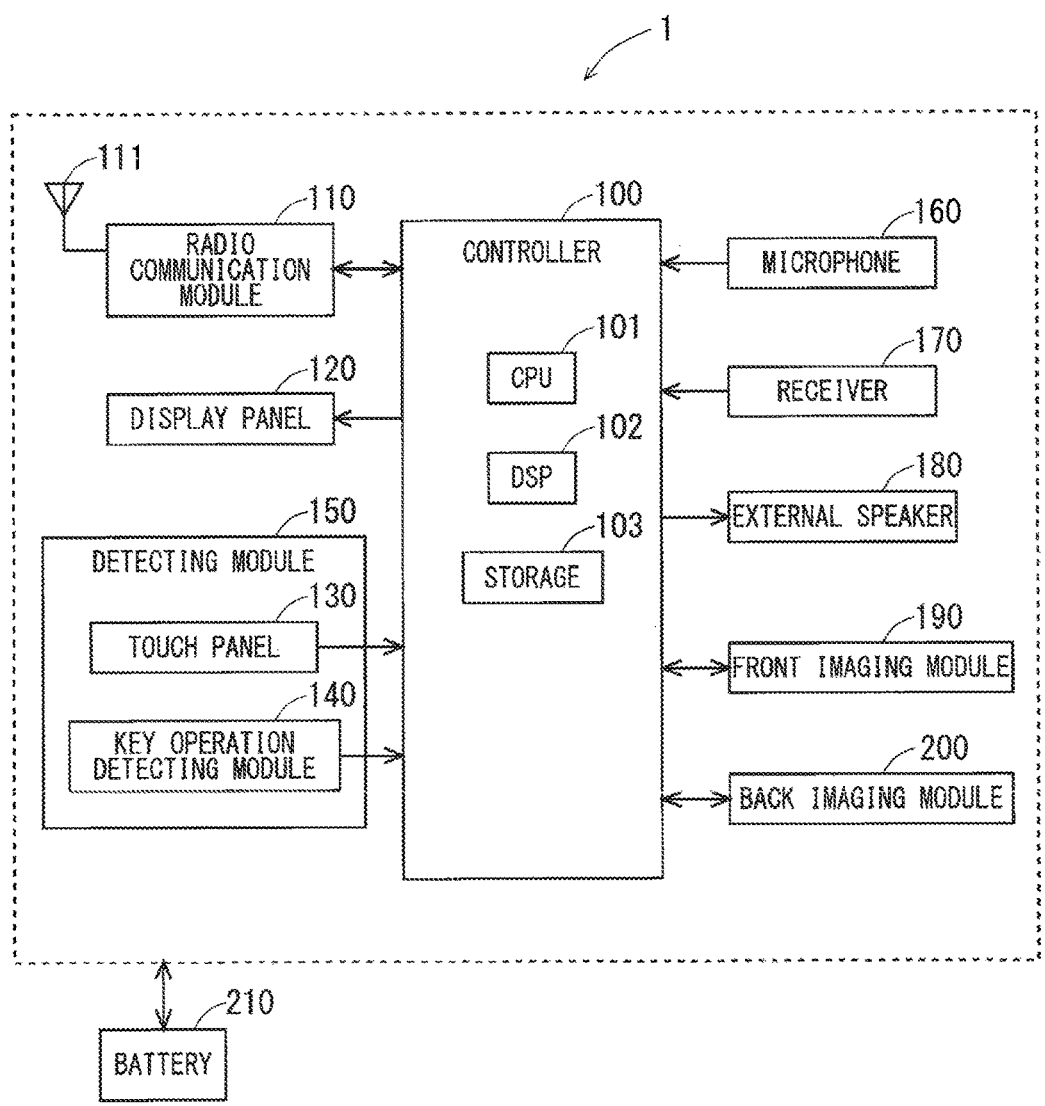
FIG. 3 illustrates a block diagram mainly showing the electrical structure of the electronic device.

FIG. 3 is a block diagram showing the electrical structure of the electronic device 1. As shown in FIG. 3, the electronic device 1 includes a controller 100, a radio communication module 110, a display panel 120, and a detecting module 150. The electronic device 1 further includes a microphone 160, a receiver 170, an external speaker 180, the front imaging module 190, the back imaging module 200, and a battery 210. These components of the electronic device 1 are housed in the device case 4.

The controller 100 includes a CPU (central processing unit) 101, a DSP (digital signal processor) 102 and a storage 103, for example. The controller 100 controls the other components of the electronic device 1 to manage the behavior of the electronic device 1 in a centralized manner. The storage 103 is formed of a non-transitory recording medium such as a ROM (read only memory) or a RAM (random access memory) readable by the electronic device 1 (CPU 101 and DSP 102). The storage 103 may include a non-transitory computer-readable recording medium other than a ROM and a RAM. The storage 103 may include a hard disk drive, an SSD (solid state drive), or a USB (universal serial bus) memory, for example.

As shown in FIG. 4, the storage 103 stores a main program 103a, multiple application programs 103b and others. The main program 103a functions as a control program to control the behavior of the electronic device 1, specifically, to control all the components of the electronic device 1 including the radio communication module 110 and the display panel 120. Various functions of the controller 100 are realized by the CPU 101 and DSP 102 executing various programs in the storage 103. In the controller 100, executing the main program 103a forms various functional blocks as shown in FIG. 4 such as an executing module 100a to execute the application programs 103b and a display controller 100b to control the display panel 120.

The radio communication module 110 has an antenna 111. The radio communication module 110 can receive a signal at the antenna 111 transmitted via a base station and the like from a mobile phone different from the electronic device 1 or a communication device such as a web server connected on the Internet. The radio communication module 110 can amplify and down-convert the received signal and output the resultant received signal to the controller 100. The controller 100 can acquire an audio signal indicating voice, music or the like from the received signal input to the controller 100 by demodulating the received signal, for example. The radio communication module 110 can up-convert and amplify a transmission signal including the audio signal or the like generated by the controller 100 and transmit the processed transmission signal by radio from the antenna 111. The transmission signal from the antenna 111 is received via the base station and the like by a mobile phone different from the electronic device 1 or a communication device connected on the Internet.

The display panel 120 is a liquid crystal display panel or an organic EL panel, for example. Under control by the display controller 100b of the controller 100, various information including characters, symbols, and figures are displayed on the display panel 120. Information displayed on the display panel 120 appears in the display region 2a in the front of the cover panel 2, so that this information becomes visible by a user of the electronic device 1.

The detecting module 150 can detect user's operation on the electronic device 1. The detecting module 150 includes the touch panel 130 that can detect operation on the display region 2a of the cover panel 2 with a contact part such as a finger, and a key operation detecting part 140 that can detect press of each operation key 5 and the PTT button 9 by a user.

The touch panel 130 is a projective capacitive touch panel, for example, and is affixed to the back of the cover panel 2. When a user performs operation on the display region 2a of the cover panel 2 with a contact part such as a finger, a signal corresponding to that operation is input from the touch panel 130 to the controller 100. Based on the signal from the touch panel 130, the controller 100 can specify the content of the operation on the display region 2a and perform process responsive to the content.

The key operation detecting module 140 can detect whether each operation key 5 is being pressed (operated). When the operation key 5 is not being pressed, the key operation detecting module 140 outputs a non-operation signal indicating that this operation key 5 is not being operated to the controller 100. When the operation key 5 is being pressed, the key operation detecting module 140 outputs an operation signal indicating that this operation key 5 is being operated to the controller 100. In this way, the controller 100 is allowed to determine whether each operation key 5 is being operated. Further, when the PTT button 9 is not being pressed, the key operation detecting module 140 outputs a non-operation signal indicating that the PTT button 9 is not being operated to the controller 100. When the PTT button 9 is being pressed, the key operation detecting module 140 outputs an operation signal indicating that the PTT button 9 is being operated to the controller 100. In this way, the controller 100 is allowed to determine whether the PTT button 9 is being operated.

When the key operation detecting module 140 detects press of the home key 5a and then detects release of the home key 5a from the press, the display controller 100b of the controller 100 makes the display panel 120 display a home screen (initial screen). As a result, the home screen is displayed in the display region 2a. When the key operation detecting module 140 detects press of the menu key 5b and then detects release of the menu key 5b from the press, the display controller 100b makes the display panel 120 display an option menu screen. As a result, the option menu screen is displayed in the display region 2a. When the key operation detecting module 140 detects press of the back key 5c and then detects release of the back key 5c from the press, the display controller 100b makes the display panel 120 go back to the last display. As a result, the last display appears again in the display region 2a.

The microphone 160 can convert sound input from outside the electronic device 1 to an electrical sound signal and output the sound signal to the controller 100. The sound from outside the electronic device 1 is captured into the electronic device 1 via the microphone hole 6 formed in the front of the cover panel 2 and is then input to the microphone 160.

The external speaker 180 is a dynamic speaker, for example. The external speaker 180 can convert an electrical sound signal from the controller 100 to sound and output the sound. The sound from the external speaker 180 is output to the outside via the speaker holes 8 formed in the back of the electronic device 1. The sound output via the speaker holes 8 can be heard in a place distanced from the electronic device 1.

The front imaging module 190 is formed of the imaging lens 191, an imaging element and the like. Under control by the controller 100, the front imaging module 190 can pick up a still image and moving images. As shown in FIG. 1, the imaging lens 191 is provided on the front of the electronic device 1. Thus, the front imaging module 190 can pick up an image of an object on the front side (on the side of the cover panel 2) of the electronic device 1.

The back imaging module 200 is formed of the imaging lens 201, an imaging element and the like. Under control by the controller 100, the back imaging module 200 can pick up a still image and moving images. As shown in FIG. 2, the imaging lens 201 is provided on the back of the electronic device 1. Thus, the back imaging module 200 can pick up an image of an object on the back side of the electronic device 1.

The receiver 170 is to output receiving sound and is formed of a dynamic speaker, for example. The receiver 170 can convert an electrical sound signal from the controller 100 to sound and outputs the sound. The sound from the receiver 170 is output to the outside via the receiver hole 7 formed in the front of the electronic device 1. The volume of the sound output via the receiver hole 7 is smaller than that of sound output via the speaker holes 8.

The battery 210 can output a power source for the electronic device 1. The power source output from the battery 210 is supplied to various electronic components provided for example in the controller 100 and the radio communication module 110 of the electronic device 1.

The storage 103 can store various application programs 103b (hereinafter simply called applications 103b"). The storage 103 can store a telephone application for conversation by using a telephone function, a PTT application for conversation using push to talk (hereinafter called "PTT conversation"), a browser for display of a web site, and a mail application for generating, browsing, and transmitting and receiving an electronic message, for example. The storage 103 further can store a television application for viewing and recording a television program, a music reproduction control application for reproduction control of music data stored in the storage 103, an access point application for making the electronic device 1 function as an access point of a wireless LAN (local area network), and a wireless LAN application for making the electronic device 1 communicate via an access point of a wireless LAN, for example.

The storage 103 can store not only an application 103b for achieving high functionality such as the aforementioned telephone application or PTT application but also an application 103b for achieving low functionality called a "widget." The widget includes one that makes part of a function realized as a result of execution of an application run in a simplified manner while restricting the part of the function. As an example, according to such a widget, information to be displayed as a result of execution of an application appears partially.

When the controller 100 reads an application 103b from the storage 103 and executes the read application 103b while executing the main program 103a in the storage 103, different components of the electronic device 1 including the radio communication module 110, the display panel 120, and the receiver 170 are put under control by the controller 100. As a result, a function (process) corresponding to the executed application 103b is carried out by the electronic device 1. As an example, the controller 100 executing the telephone application controls the radio communication module 110, the microphone 160, and the receiver 170. As a result, in the electronic device 1, voice in a received signal received by the radio communication module 110 is output from the receiver 170 and a transmission signal including voice input to the microphone 160 is transmitted from the radio communication module 110, thereby making conversation with a communication partner device using the telephone function.

<Type of Operation on Display Region>

Operation performed by a user on the display region 2*a* includes a slide operation, a tap operation and a flick operation, for example.

The slide operation means moving of a contact part such as a finger while the contact part contacts the display region 2*a*. By performing the slide operation on the display region 2*a*, a user can scroll display in the display region 2*a* or change a page being displayed in the display region 2*a* to a different page.

The tap operation means operation in which a contact part contacts the display region 2*a* and depart from the display region 2*a* immediately thereafter. More specifically, the tap operation means operation in which the contact part contacts the display region 2*a* in some position and depart from the display region 2*a* in the same position within a given time. By performing the tap operation on the display region 2*a*, a user can select an icon for executing an application 103*b* (hereinafter called an "application icon") displayed in the display region 2*a* and execute this application 103*b*, for example.

The flick operation means operation of sweeping the display region 2*a* with a contact part. More specifically, the flick operation means operation in which the time period from the contact part contacting the display region 2*a* until the contact part departing from the display region 2 is a given time or less while a moving distance from the contact part contacting the display region 2*a* until the contact part departing from the display region 2 is a given distance or more. By performing the flick operation on the display region 2*a*, a user can scroll display in the display region 2*a* in a direction of the flick operation or change a page being displayed in the display region 2*a* to a different page.

<Control of Display on Electronic Device>

<Home Screen>

As described above, in the electronic device 1, the home screen is displayed in the display region 2*a* in response to operation on the home key 5*a*. Specifically, when the key operation detecting module 140 detects operation on the home key 5*a* instructing display of the home screen, the display controller 100*b* makes the display panel 120 display the home screen.

The home screen mentioned herein is formed of multiple page screens 300 that can be switched and displayed in turn. In this embodiment, the home screen is formed of five page screens 300, for example. In response to operation on the home key 5*a*, one of the five page screens 300 is displayed in the display region 2*a*. In response to user's operation on the electronic device 1 to switch the home screen, the multiple page screens 300 are switched and displayed in turn in the display region 2*a*. In the below, the five page screens 300 forming the home screen are called first to fifth page screens 300 respectively.

In this embodiment, in response to operation on the home key 5*a*, the first page screen 300 out of the first to fifth page screens 300 of the home screen is displayed first in the display region 2*a*. When a user performs the slide operation or the flick operation on the display region 2*a* to the right with a contact part such as a finger while the first page screen 300 is displayed in the display region 2*a*, the second page screen 300 appears in the display region 2*a*. When the user performs the slide operation or the flick operation on the display region 2*a* to the left while the first page screen 300 is displayed in the display region 2*a*, the third page screen 300 appears in the display region 2*a*.

When the user performs the slide operation or the flick operation on the display region 2*a* to the right while the second page screen 300 is displayed in the display region 2*a*, the fourth page screen 300 appears in the display region 2*a*. When the user performs the slide operation or the flick operation on the display region 2*a* to the left while the second page screen 300 is displayed in the display region 2*a*, the first page screen 300 appears in the display region 2*a*.

When the user performs the slide operation or the flick operation on the display region 2*a* to the right while the third page screen 300 is displayed in the display region 2*a*, the first page screen 300 appears in the display region 2*a*. When the user performs the slide operation or the flick operation on the display region 2*a* to the left while the third page screen 300 is displayed in the display region 2*a*, the fifth page screen 300 appears in the display region 2*a*.

In this way, in response to user's slide operation and the like to the left or to the right on the display region 2*a*, the multiple page screens 300 are switched and displayed in turn in the display region 2*a*. User's slide operation and the like to the right on the display region 2*a* allows turning to a left page screen 300. User's slide operation and the like to the left on the display region 2*a* allows turning to a right page screen 300.

FIG. 5 shows one of the five page screens 300 forming the home screen displayed in the display region 2*a* (display panel 120). As shown in FIG. 5, one page screen 300 is formed of a first region 310, a second region 320, and a third region 400.

The content of display (display information) in the first region 310 is common to the first to fifth page screens 300. Specifically, the first region 310 is a region where the content of display therein is not changed by switching of a screen between the first to fifth page screens 300. Only an application icon 250 is arranged in the first region 310. Up to five application icons 250 can be arranged in the first region 310. A user arranges an application icon 250 in the first region 310 for executing an application 103*b* to be used frequently.

The content of display in the second region 320 differs between the first to fifth page screens 300. Up to 16 application icons 250 can be arranged in the second region 320. The second region 320 can include not only an application icon 250 but also widget execution information to be displayed on the page screen 300 in response to execution of a widget.

The second region 320 is partitioned into multiple block regions arranged in a matrix. In the second region 320 of this embodiment, four block regions are juxtaposed in the row direction (horizontal direction) and four block regions are juxtaposed in the column direction (vertical direction). Thus, the second region 320 is partitioned into 16 block regions. In the second region 320, one application icon 250 can be arranged only in one bock region. This allows arrangement of up to 16 application icons 250 in the second region 320.

Widget execution information is to be displayed in the second region 320 in a size that can be determined in units of block regions. As an example, the widget execution information may be displayed in a size corresponding to one block region in terms of the column direction and four block regions in terms of the row direction. Alternatively, the widget execution information may be displayed in a size corresponding to two block regions in terms of the column direction and two block regions in terms of the row direction. In the second region 320, the widget execution information is to be displayed in a size corresponding to X block regions (X≥1) in terms of the column direction and Y block regions (Y≥1) in terms of the row direction. In this case, the arrangement of this widget execution information in terms of the column direction is allowed only within the X block regions juxtaposed in the column direction and the arrangement of this widget execution information in terms of the row direction is allowed only within the Y block regions juxtaposed in the row direction.

Superimposing multiple application icons 250 is not allowed in the second region 320. Superimposing an application icon 250 and widget execution information is not allowed in the second region 320. Superimposing multiple pieces of widget execution information is not allowed in the second region 320.

In the below, the size of a region covering X block regions in the column direction and Y block regions in the row direction will be called an "X×Y size" in some cases.

The third region 400 is a region that is always included on a display screen in the display region 2a (display panel 120) even if a display screen in the display region 2a is switched. Specifically, the third region 400 is a region that is always included on any display screen in the display region 2a (display panel 120). The third region 400 is a region to notify a user of the condition of the electronic device 1 and contains information indicating the condition of the electronic device 1. In one example of FIG. 5, the third region 400 includes a current time 401 measured by the electronic device 1, an icon (FIG. 402 indicating a remaining battery level, an icon (FIG. 403 indicating a communication condition, an icon (FIG. 404 indicating the presence of a new mail, and an icon (FIG. 405 indicating the presence of a missed call. In the below, the third region 400 will be called a "device condition notifying region 400."

Switching between the page screens 300 (turning over the page screens) by a user on the aforementioned home screen makes the user feel that only the content displayed in the second region 320 is switched.

In response to user's operation to select an application icon 250 displayed in the display region 2a, the executing module 100a of the controller 100 reads an application 103b corresponding to this selected application icon 250 from the storage 103 and executes the read application 103b. The application icon 250 can be selected by operation such as the tap operation on the display region 2a, for example.

<Display Screen During the Course of PTT Conversation>

FIG. 6 shows a PTT conversation screen 500 displayed in the display region 2a (display panel 120) immediately after the electronic device 1 starts PTT conversation. The electronic device 1 can make PTT conversation with one or multiple conversation partner terminals.

To make PTT conversation, a user performs operation to select an application icon 250 displayed in the display region 2a corresponding to the PTT application. In response, the executing module 100a executes the PTT application. Then, the user operates the display region 2a to input the number of a conversation partner terminal or the number of a group of conversation partners. Next, in response to press of the PTT button 9 by the user, the electronic device 1 starts PTT conversation with one conversation partner terminal or with multiple conversation partner terminals belonging to one group. During the course of the PTT conversation, the user can transmit voice of the user himself or herself to a conversation partner while pressing the PTT button 9.

The user can start the PTT conversation by referring a phone book without selecting the application icon 250 corresponding to the PTT application. In response to given operation on the display region 2a by the user, the phone book in the storage 103 is displayed in the display region 2a. The user operates the display region 2a to display the number of a conversation partner terminal or the number of a group of conversation partners in the phone book. Then, the user performs operation on the display region 2a to select the number of the conversation partner terminal or the number of the group of conversation partners. Next, in response to press of the PTT button 9 by the user, the executing module 100a executes the PTT application. This makes the electronic device 1 start PTT conversation with one conversation partner terminal or with multiple conversation partner terminals belonging to one group.

After the electronic device 1 starts the PTT conversation, the PTT conversation screen 500 of FIG. 6 is displayed in the display region 2a. The PTT conversation screen 500 contains information about the PTT conversation currently made.

As shown in FIG. 6, the PTT conversation screen 500 is formed of the aforementioned device condition notifying region 400, a screen type notifying region 510, a conversation condition notifying region 520, and a setting region 530. The screen type notifying region 510 includes a character string notifying that a display screen in the display region 2a is the PTT conversation screen 500.

The conversation condition notifying region 520 contains information of various types for notifying a user of a current condition of PTT conversation. The conversation condition notifying region 520 includes a name 521 of a conversation partner registered with the phone book, an image 522 registered with the phone book in association with the conversation partner (such as a photograph image of the face of a user of a conversation partner terminal), and a PTT conversation duration 523. While the electronic device 1 makes PTT conversation with one conversation partner terminal, the name of a user of this conversation partner terminal generally appears as the name 521 in the conversation condition notifying region 520. While the electronic device 1 makes PTT conversation with multiple conversation partner terminals belonging to one group, the name of this group appears as the name 521 in the conversation condition notifying region 520.

The conversation condition notifying region 520 further includes an image 524 showing a current condition of the right to speak (called the "floor") in PTT conversation, a name 525 of a terminal currently having the floor (generally, the name of a user of this terminal) registered with the phone book, and an image 526 registered with the phone book in association with the terminal currently having the floor. In one example of FIG. 6, the image 524 in the conversation condition notifying region 520 shows that a terminal other than the electronic device 1 has the floor. When the electronic device 1 has the floor, a character string in the center of the image 524 becomes "Talking." In the absence of a terminal having the floor, a character string in the center of the image 524 becomes "Open."

The setting region 530 includes a finish button 531 for finishing PTT conversation, a conversation partner adding button 532 for adding a conversation partner, a switchover button 533 for switching PTT conversation to conversation using a telephone function, and a setting button 534 for determining whether a communication function adopting Bluetooth (registered trademark) is to be used for PTT conversation. The setting button 534 includes an ON button 534*b* for determining that the communication function adopting Bluetooth is to be used and an OFF button 534*a* for determining that the communication function adopting Bluetooth is not to be used. A user can finish PTT conversation by performing the tap operation on the finish button 531. Specifically, when the detecting module 150 detects the tap operation on the finish button 531, the electronic device 1 finishes PTT conversation.

<Display Control During Switching from PTT Conversation Screen to Different Screen>

In the electronic device 1 of this embodiment, when the display controller 100*b* makes the display panel 120 display a display screen different from the PTT conversation screen 500 during the course of PTT conversation, the display controller 100*b* incorporates information on the PTT conversation screen 500 into a partial region of this different display screen. Specifically, when a display screen different from the PTT conversation screen 500 is displayed in the display region 2*a* while the electronic device 1 makes PTT conversation, part of information on the PTT conversation screen 500 is incorporated into a partial region of this different display screen.

Figure 7:
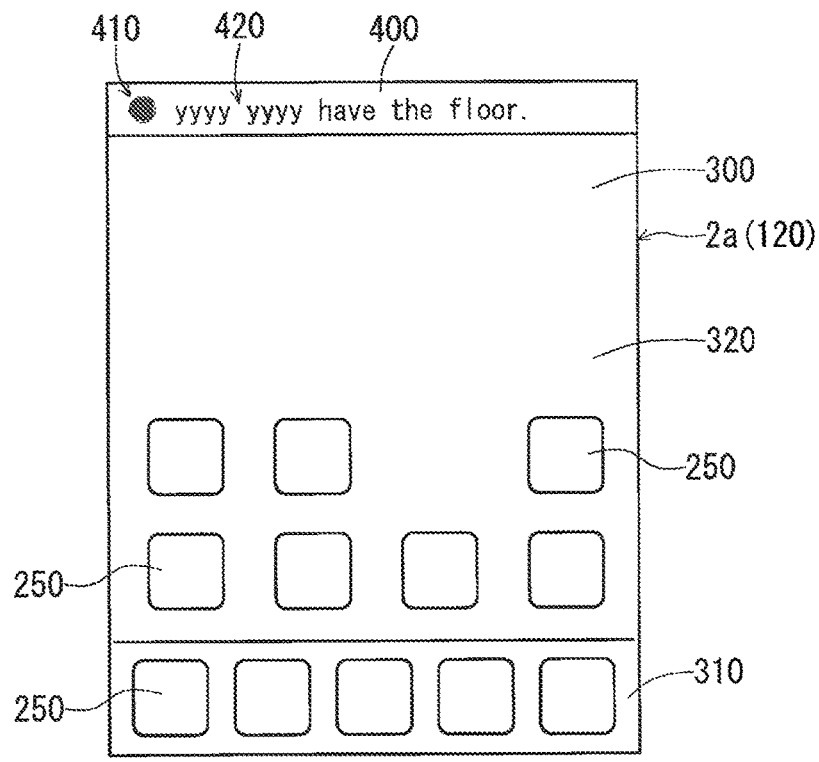
FIG. 7 illustrates an exemplary display screen displayed on the electronic device.

FIG. 7 shows switching of display in the display region 2*a* (display panel 120) from the PTT conversation screen 500 to the first page screen 300 of the home screen while the electronic device 1 makes PTT conversation.

When a user operates the home key 5*a* while the PTT conversation screen 500 is displayed in the display region 2*a*, the display controller 100*b* switches display on the display panel 120 from the PTT conversation screen 500 to the first page screen 300 of the home screen. This switches display in the display region 2*a* from the PTT conversation screen 500 to the first page screen 300.

When display in the display region 2*a* is switched from the PTT conversation screen 500 to the first page screen 300, part of information on the PTT conversation screen 500 is incorporated into the device condition notifying region 400 of this first page screen 300. As an example, information about a current condition of the floor in PTT conversation, of all the information included in the PTT conversation screen 500, is incorporated into the device condition notifying region 400 of the first page screen 300.

In this embodiment, for a few seconds after display in the display region 2*a* (display panel 120) is switched from the PTT conversation screen 500 to the first page screen 300, the current time 401 and the icons 402 to 405 having been displayed disappear from the device condition notifying region 400 of this first page screen 300. Instead, an icon (FIG. 410 and a character string 420 indicating the condition of the floor in PTT conversation both appear in the device condition notifying region 400 of this first page screen 300. After an elapse of the few seconds after display in the display region 2*a* is switched from the PTT conversation screen 500 to the first page screen 300, the character string 411 disappears and the icon 410 appears together with the current time 401 and the icons 402 to 405 in the device condition notifying region 400 of this first page screen 300.

FIG. 7 shows the first page screen 300 displayed when the few seconds have not elapsed after display in the display region 2*a* is switched from the PTT conversation screen 500 to this first page screen 300 while a terminal other than the electronic device 1 has the floor. A black circle indicating that the terminal other than the electronic device 1 has the floor appears as the icon 410 in the device condition notifying region 400 of this first page screen 300. A character string indicating that the terminal other than the electronic device 1 has the floor appears as the character string 420 in the device condition notifying region 400 of this first page screen 300. This character string 420 includes the name of the terminal currently having the floor (in one example of FIG. 7, "yyyy yyyy").

Figure 8:
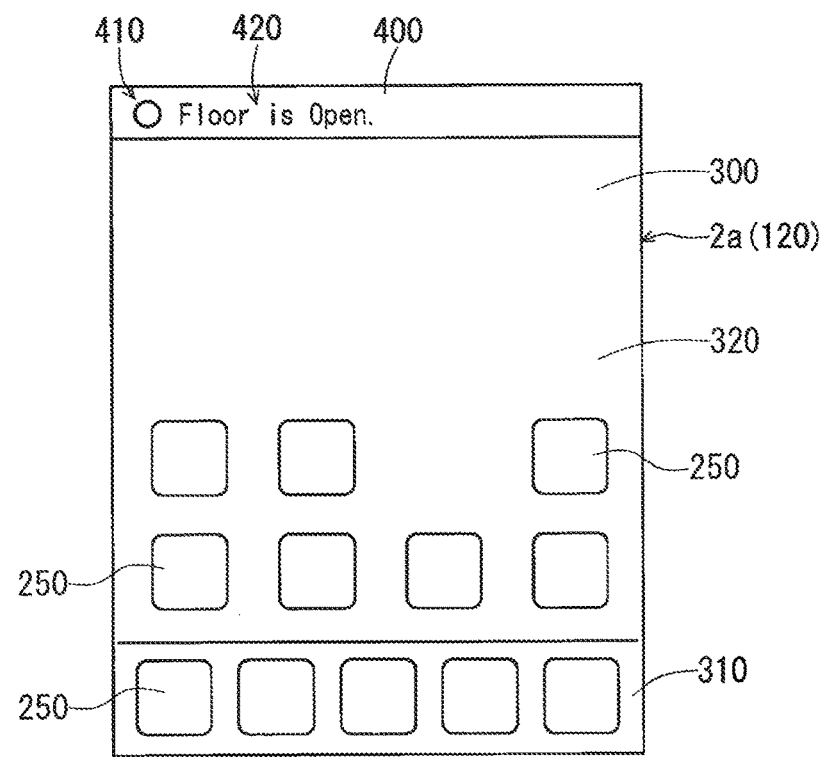
FIG. 8 illustrates an exemplary display screen displayed on the electronic device.

FIG. 8 shows the first page screen 300 displayed when the few seconds have not elapsed after display in the display region 2*a* is switched from the PTT conversation screen 500 to this first page screen 300 while no terminal has the floor (while no one has the floor). A white circle indicating that no terminal has the floor appears as the icon 410 in the device condition notifying region 400 of this first page screen 300. A character string indicating that no terminal has the floor appears as the character string 420 in the device condition notifying region 400 of this first page screen 300.

FIG. 9 shows the first page screen 300 displayed when the few seconds have not elapsed after display in the display region 2*a* is switched from the PTT conversation screen 500 to this first page screen 300 while the electronic device 1 has the floor. A white triangle indicating that the electronic device 1 has the floor appears as the icon 410 in the device condition notifying region 400 of this first page screen 300. A character string indicating that the electronic device 1 has the floor appears as the character string 420 in the device condition notifying region 400 of this first page screen 300.

FIG. 10 shows the first page screen 300 displayed after the few seconds have elapsed after display in the display region 2*a* is switched from the PTT conversation screen 500 to this first page screen 300 while a terminal other than the electronic device 1 has the floor. A black circle indicating that the terminal other than the electronic device 1 has the floor appears as the icon 410 in the device condition notifying region 400 of this first page screen 300 together with the current time 401 and the icons 402 to 405 having been displayed before switching of display in the display region 2*a* to this first page screen 300. The character string 411 is not present in the device condition notifying region 400 of this first page screen 300.

The icon 410 in the device condition notifying region 400 changes in response to change in the condition of the floor in PTT conversation. As an example, in response to change from a condition where there is no terminal having the floor to a condition where the electronic device 1 has the floor, the icon 410 in the device condition notifying region 400 changes from a white circle to a white triangle.

After the icon 410 appears in the device condition notifying region 400, as long as PTT conversation continues, the icon 410 is always present in the device condition notifying region 400 on a display screen in the display region 2*a* independently of display in the display region 2*a*.

Even if a browser is executed and a display screen containing a web page is displayed in the display region 2*a* during the course of PTT conversation, for example, the icon 410 is still present in the device condition notifying region 400 of this display screen. Even if a mail application is started and a display screen for creating a mail is displayed in the display region 2*a* during the course of PTT conversation, the icon 410 is still present in the device condition notifying region 400 of this display screen. Even if a television application is executed and a display screen containing images of a television program is displayed in the display region 2*a* during the course of PTT conversation, the icon 410 is still present in the device condition notifying region 400 of this display screen.

When the PTT conversation screen 500 is displayed in the display region 2a after the icon 410 appears in the device condition notifying region 400, the icon 410 can be omitted from the device condition notifying region 400 of this PTT conversation screen 500.

In the electronic device 1, when the finish button 531 on the PTT conversation screen 500 is operated to finish PTT conversation, the icon 410 disappears from the device condition notifying region 400.

<Pull-Down Display of Device Condition>

In this embodiment, in response to given operation on the device condition notifying region 400 in the display region 2a, the condition of the electronic device 1 is displayed in a pull-down manner in association with information in this device condition notifying region 400. When the detecting module 150 detects operation to pull down the device condition notifying region 400, specifically downward slide operation on the display region 2a starting from the device condition notifying region 400, the display controller 100b makes the display panel 120 display a notifying screen 600 containing information about the condition of the electronic device 1. As a result, the notifying screen 600 is displayed in the display region 2a. FIG. 11 shows how a user performs the downward slide operation on the display region 2a starting from the device condition notifying region 400 with a finger 550.

Figure 12:
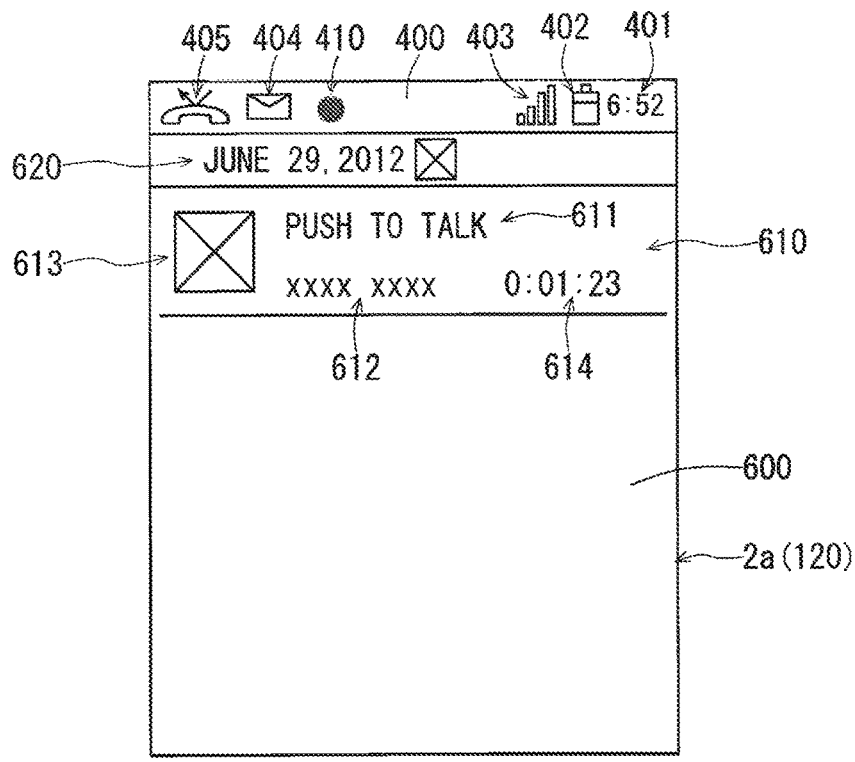
FIG. 12 illustrates an exemplary display screen displayed on the electronic device.

FIG. 12 shows an example of the notifying screen 600. A region of the notifying screen 600 except the device condition notifying region 400 is displayed so as to extend downward gradually (in a pull-down manner) in response to the downward slide operation on the display region 2a.

The notifying screen 600 of FIG. 12 includes a current date 620 measured by the electronic device 1. The notifying screen 600 further includes conversation relating information 610 relating to PTT conversation currently made. The conversation relating information 610 contains information included in the PTT conversation screen 500. More specifically, the conversation relating information 610 includes a character string 611 for notifying a user of the fact that this conversation relating information 610 is about PTT conversation, a name 612 of a conversation partner registered with the phone book, an image 613 registered with the phone book in association with the conversation partner, and a PTT conversation duration 614.

Although not shown in FIG. 12, the notifying screen 600 contains information shown in a form such as a character string indicating the presence of a new mail in association with the icon 404 in the device condition notifying region 400. The notifying screen 600 further contains information shown in a form such as a character string indicating the presence of a missed call in association with the icon 405 in the device condition notifying region 400.

<Redisplay of PTT Conversation Screen>

Figure 13:
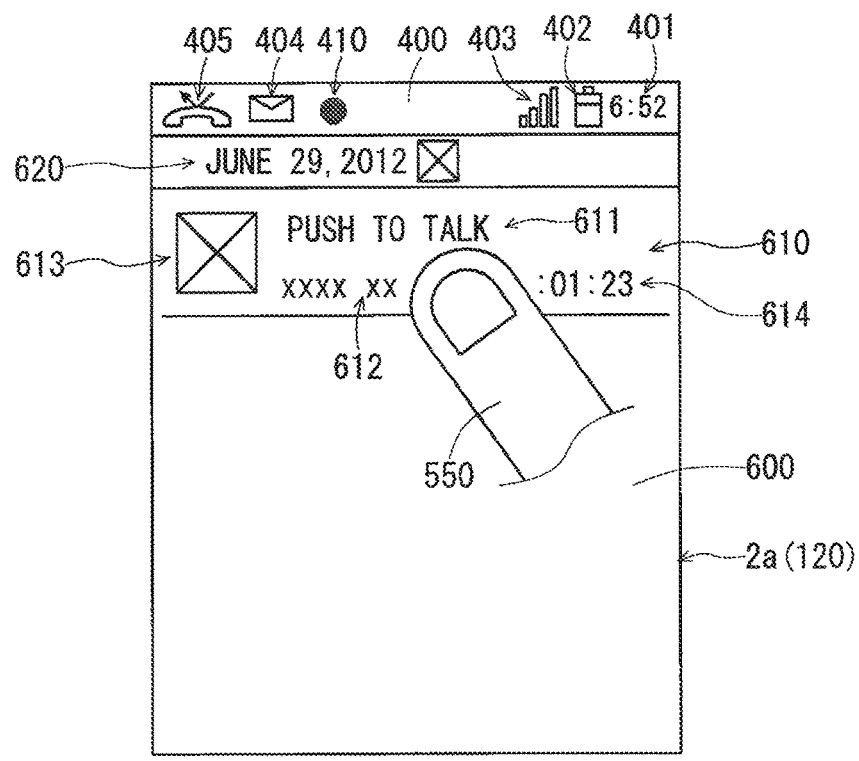
FIG. 13 illustrates how a user operates the display region of the electronic device.

When a user selects the conversation relating information 610 on the notifying screen 600, the PTT conversation screen 500 is redisplayed in the display region 2a. More specifically, when the detecting module 150 detects operation to select the conversation relating information 610 on the notifying screen 600 such as the tap operation, the display controller 100b switches display on the display panel 120 from the notifying screen 600 to the PTT conversation screen 500. This switches display in the display region 2a from the notifying screen 600 to the PTT conversation screen 500 to redisplay the PTT conversation screen 500. FIG. 13 shows how a user performs the tap operation on the conversation relating information 610 of the notifying screen 600 with a finger 550.

In this embodiment, when the PTT button 9 is operated during the course of PTT conversation while a display screen other than the PTT conversation screen 500 is displayed in the display region 2a, the PTT conversation screen 500 is redisplayed in the display region 2a.

When an application icon 250 shown in the display region 2a corresponding to the PTT application is performed the tap operation during the course of PTT conversation, the PTT conversation screen 500 is redisplayed in the display region 2a.

While a display screen different from the PTT conversation screen 500 is displayed during the course of PTT conversation, the PTT conversation screen 500 may be redisplayed in response to the tap operation on the device condition notifying region 400 in this different display screen.

As described above, in this embodiment, when a display screen different from the PTT conversation screen 500 is displayed while the electronic device 1 makes PTT conversation, part of information on this PTT conversation screen 500 is incorporated into a partial region of this different display screen. Thus, even if the home screen is displayed or a different display screen is displayed as a result of execution of a different application 103b during the course of the PTT conversation, a user can still check information about the PTT conversation. In the aforementioned one example, the user not only can see the fact that the PTT conversation is currently made but also can check a current condition of the floor in the PTT conversation. This can prevent the user from failing to check information about PTT conversation while the user makes this PTT conversation.

In this embodiment, the device condition notifying region 400 to display information on the PTT conversation screen 500 is a region always included on a display screen in the display region 2a (display panel 120) even if this display screen in the display region 2a is switched. This can prevent the user from failing to check information about PTT conversation further while the user makes this PTT conversation.

The character string 420 is not always displayed in the device condition notifying region 400 while a display screen other than the PTT conversation screen 500 is displayed. This allows this device condition notifying region 400 to contain different information.

When a display screen different from the PTT conversation screen 500 is displayed during the course of PTT conversation, the icon (FIG. 410 appears in the device condition notifying region 400. This can prevent failing to check information about PTT conversation while confining a region to be occupied by information relating to the PTT conversation in the device condition notifying region 400.

The foregoing description proceeds while PTT conversation is given as an example. The foregoing description is further applicable to execution of a different function. For example, while the television application is executed and a television program is recorded, when a display screen (such as a display screen including the home screen or a web page) different from a television recording screen containing information about the recording (such as the name of the recorded program or a channel broadcasting the recorded program, for example) is displayed, information on this television recording screen is incorporated into a partial region of this different display screen. Even if a display screen different from a television recording screen is displayed while a television program is being recorded, this allows a user to check information about the recording being done.

Second Embodiment

In a second embodiment, while a display screen different from the PTT conversation screen 500 is displayed during the course of PTT conversation, a widget is executed and at least part of information on the PTT conversation screen 500 is included in a part of this different display screen. Even if a displayed screen is different from the PTT conversation screen 500, this still allows a user to check information on the PTT conversation screen 500. Control of display on the electronic device 1 of this embodiment is described below in detail. The following description is mainly intended for a difference from the first embodiment described above.

Figure 14:
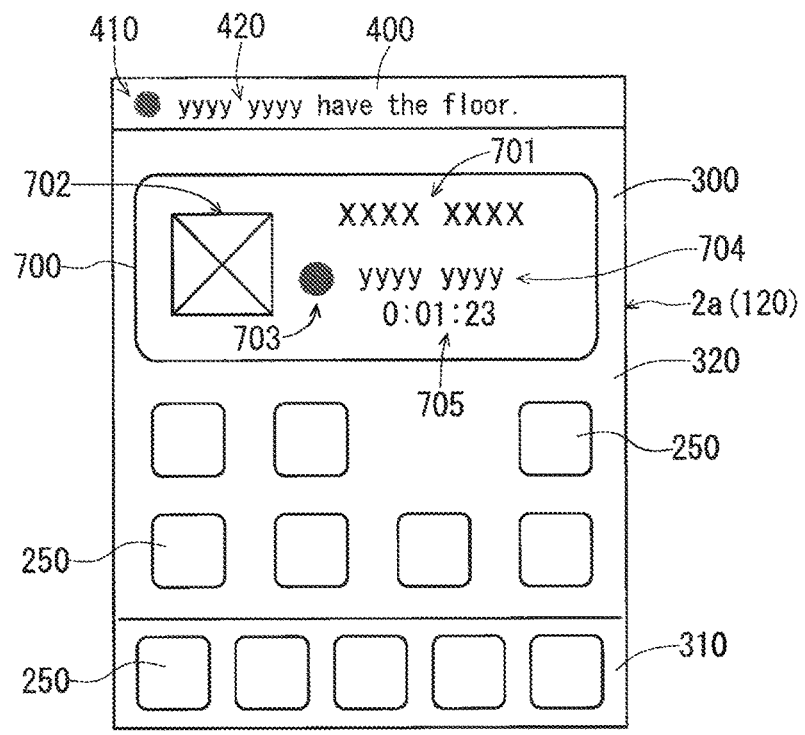
FIG. 14 illustrates an exemplary display screen displayed on the electronic device.

FIG. 14 shows the first page screen 300 of the home screen appearing in response to switching from the PTT conversation screen 500 to this first page screen 300. When the detecting module 150 detects operation on the home key 5a while the PTT conversation screen 500 is displayed in the display region 2a, the executing module 100a executes a widget for displaying information on the PTT conversation screen 500 (hereinafter called a "PTT widget") while the display controller 100b switches display on the display panel 120 from the PTT conversation screen 500 to the first page screen 300. As a result, display in the display region 2a is switched from the PTT conversation screen 500 to the first page screen 300. The PTT widget is executed only during the course of PTT conversation.

Like in the first embodiment, after display in the display region 2a is switched from the PTT conversation screen 500 to the first page screen 300, information about a current condition of the floor in the PTT conversation is incorporated into the device condition notifying region 400 of this first page screen 300.

In this embodiment, for a few seconds after display in the display region 2a is switched from the PTT conversation screen 500 to the first page screen 300, the current time 401 and the icons 402 to 405 having been displayed also disappear from the device condition notifying region 400 of this first page screen 300. Instead, the icon (FIG. 410 and the character string 420 both appear in the device condition notifying region 400 of this first page screen 300. After an elapse of the few seconds after display in the display region 2a is switched from the PTT conversation screen 500 to the first page screen 300, the character string 411 disappears and the icon 410 appears together with the current time 401 and the icons 402 to 405 in the device condition notifying region 400 of this first page screen 300.

In this embodiment, PTT widget execution information 700 is arranged in a part of one of the multiple page screens 300 forming the home screen. The PTT widget execution information 700 is widget execution information determined based on execution of the PTT widget. More specifically, the PTT widget execution information 700 is arranged in the second region 320 of the page screen 300. FIG. 14 shows the PTT widget execution information 700 arranged in the second region 320 of the first page screen 300. The PTT widget execution information 700 may be arranged on a page screen 300 other than the first page screen 300, as will be described later.

The PTT widget execution information 700 contains at least part of information on the PTT conversation screen 500. In this embodiment, the PTT widget execution information 700 is to be displayed in a size 2×4, for example. As shown in FIG. 14, the PTT widget execution information 700 includes a name 701 of a conversation partner registered with the phone book, and an image 702 registered with the phone book in association with the conversation partner, for example. The PTT widget execution information 700 further includes an icon 703 indicating a current condition of the floor in PTT conversation, a character string 704 indicating a current condition of the floor in the PTT conversation, and a PTT conversation duration 705.

FIG. 14 shows the PTT widget execution information 700 displayed while a terminal other than the electronic device 1 has the floor. This PTT widget execution information 700 includes a black circle as the icon 703 indicating that the terminal other than the electronic device 1 has the floor. This PTT widget execution information 700 further includes a character string as the character string 704 indicating that the terminal other than the electronic device 1 has the floor. The character string 704 indicating that the terminal other than the electronic device 1 has the floor may be the name of the terminal (in one example of FIG. 14, "yyyy yyyy") currently having the floor displayed in the display region 2a, for example.

Figure 15:
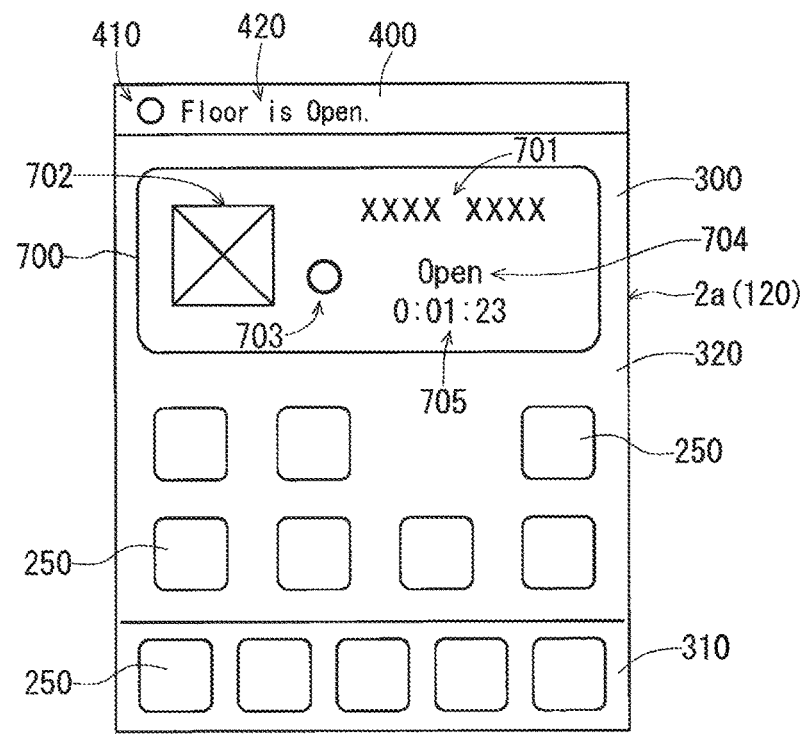
FIG. 15 illustrates an exemplary display screen displayed on the electronic device.

FIG. 15 shows the PTT widget execution information 700 displayed while no terminal has the floor. This PTT widget execution information 700 includes a white circle as the icon 703 indicating that no terminal has the floor. This PTT widget execution information 700 further includes a character string as the character string 704 indicating that no terminal has the floor. The character string 704 indicating that no terminal has the floor may be a character string such as "Open" displayed in the display region 2a, for example.

Figure 16:
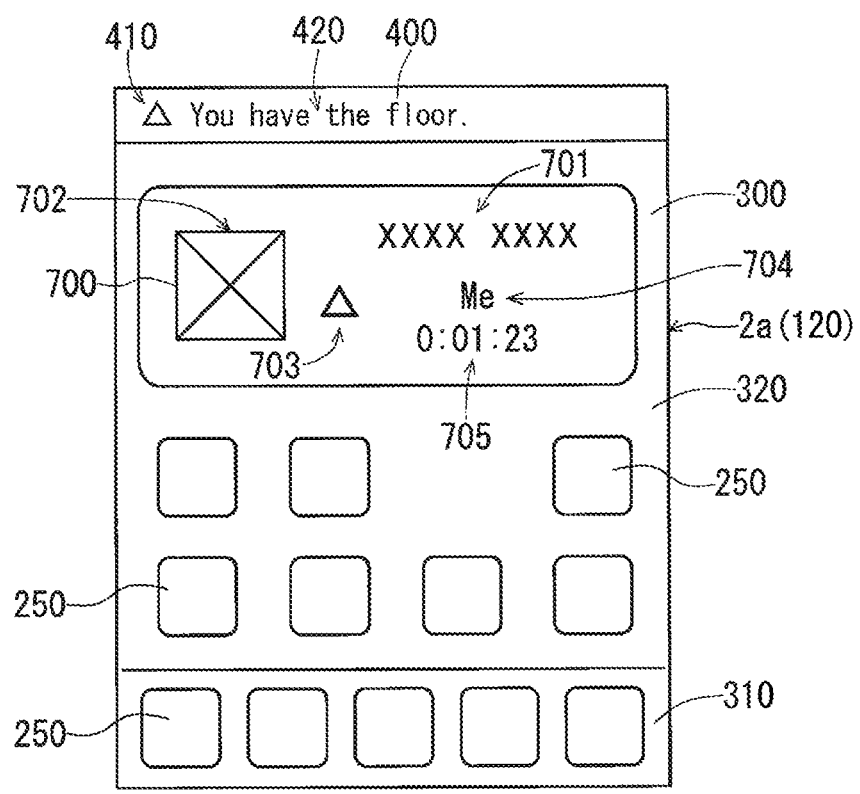
FIG. 16 illustrates an exemplary display screen displayed on the electronic device.

FIG. 16 shows the PTT widget execution information 700 displayed while the electronic device 1 has the floor. This PTT widget execution information 700 includes a white triangle as the icon 703 indicating that the electronic device 1 has the floor. This PTT widget execution information 700 further includes a character string as the character string 704 indicating that the electronic device 1 has the floor. The character string 704 indicating that the electronic device 1 has the floor may be a character string such as "Me" displayed in the display region 2a, for example.

The icon 703 and the character string 704 in the PTT widget execution information 700 change in response to change in the condition of the floor in PTT conversation. As an example, in response to change from a condition where there is no terminal having the floor to a condition where the electronic device 1 has the floor, the icon 703 in the PTT widget execution information 700 changes from a white circle to a white triangle. Further, the character string 704 displayed in the PTT widget execution information 700 changes from "Open" to "Me."

The PTT widget execution information 700 disappears when display in the display region 2a is switched from the page screen 300 containing the PTT widget execution information 700 to a different display screen. Meanwhile, as long as PTT conversation is made, display in the display region 2a can be switched to the page screen 300 containing the PTT widget execution information 700.

In this embodiment, the icon 410 and the character string 420 can be omitted from the device condition notifying region 400.

In the electronic device 1, when the finish button 531 on the PTT conversation screen 500 is operated to finish PTT conversation, the executing module 100a finishes execution of the PTT widget. In response, the PTT widget execution information 700 disappears.

<Redisplay of PTT Conversation Screen>

When a user selects the PTT widget execution information 700 on the page screen 300, the PTT conversation screen 500 is redisplayed in the display region 2a. More specifically, when the detecting module 150 detects operation to select the PTT widget execution information 700 on the page screen 300 such as the tap operation, the display controller 100b switches a display screen on the display panel 120 from the page screen 300 to the PTT conversation screen 500. This switches display in the display region 2a from the page screen 300 to the PTT conversation screen 500 to redisplay the PTT conversation screen 500.

Like in the first embodiment, when the PTT button 9 is operated during the course of PTT conversation while a display screen other than the PTT conversation screen 500 is displayed in the display region 2a, the PTT conversation screen 500 is redisplayed in the display region 2a in this embodiment.

When an application icon 250 corresponding to the PTT application shown in the display region 2a is performed the tap operation during the course of PTT conversation, the PTT conversation screen 500 is redisplayed in the display region 2a.

Like in the first embodiment, when information about PTT conversation (FIG. 410 and character string 420) is incorporated into the device condition notifying region 400, the PTT conversation screen 500 may be displayed in response to the tap operation on the device condition notifying region 400. Like in the first embodiment, the notifying screen 600 may be displayed in the display region 2a in response to given operation on the device condition notifying region 400. In this case, the PTT conversation screen 500 may be displayed in the display region 2a in response to operation to select the conversation relating information 610 on this notifying screen 600.

<Method of Determining Page Screen where PTT Widget Execution Information is to be Arranged>

As described above, multiple pieces of information (including an application icon 250 and widget execution information, for example) cannot be superimposed on each page screen 300 of the home screen. Thus, in the absence of empty space on the page screen 300, the PTT widget execution information 700 cannot be arranged on this page screen 300.

In the electronic device 1 of this embodiment, when the detecting module 150 detects operation on the home key 5a, the display controller 100b determines whether the multiple page screens 300 forming the home screen include a page screen 300 having empty space available for arrangement of the PTT widget execution information 700 having a given display size (in this example, the PTT widget execution information 700 having a display size 2×4). Specifically, the display controller 100b determines whether the multiple page screens 300 forming the home screen include a page screen 300 with the second region 320 including a region of a size 2×4 or more where information is not present. When there is a page screen having such empty space, the display controller 100b defines this page screen 300 as an arrangement target page screen 300 where the PTT widget execution information 700 is to be arranged. For display of the arrangement target page screen 300 on the display panel 120, the display controller 100b makes the display panel 120 display the arrangement target page screen 300 containing the PTT widget execution information 700. The following describes this behavior of the electronic device 1 in detail. In the following description, empty space available for arrangement of the PTT widget execution information 700 is simply called an "empty space".

Figure 17:
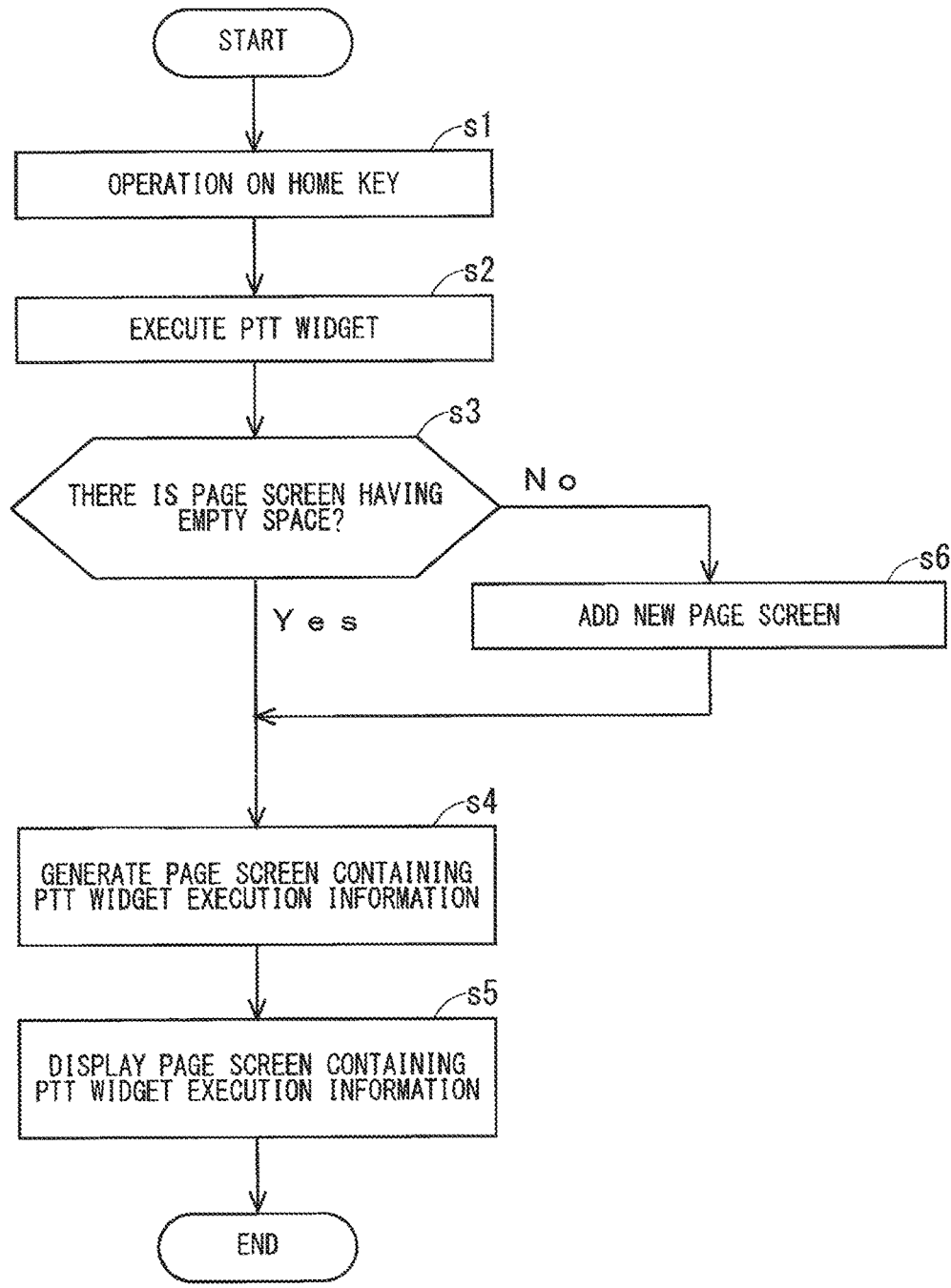
FIG. 17 illustrates a flowchart showing the behavior of the electronic device.

FIG. 17 is a flowchart showing how the electronic device 1 behaves from the time when the home key a is operated for the first time after start of PTT conversation until the time when the page screen 300 containing the PTT widget execution information 700 is displayed.

After the PTT conversation is started, the PTT conversation screen 500 is displayed in the display region 2a. As shown in FIG. 17, when the detecting module 150 detects operation on the home key a in step s1, the executing module 100a executes the PTT widget in step s2. Next, in step s3, the display controller 100b determines whether the multiple page screens 300 forming the home screen include a page screen 300 having empty space.

In step s3, the display controller 100b checks the first to fifth page screens 300 in the order named to determine whether these page screens 300 have empty space. Then, the display controller 100b defines a page screen out of the first to fifth page screens 300 as the arrangement target page screen 300 having been determined to have empty space first. When the first and second page screens 300 each have empty space, for example, the first page screen 300 is defined as the arrangement target page screen 300. When the third and fifth page screens 300 each have empty space, for example, the third page screen 300 is defined as the arrangement target page screen 300.

When the presence of the page screen 300 having empty space is determined and the arrangement target page screen 300 is decided in step s3, the display controller 100b generates an arrangement target page screen 300 containing the PTT widget execution information 700 in the second region 320 in step s4. Then, in step s5, the display controller 100b makes the display panel 120 display the arrangement target page screen 300 containing the PTT widget execution information 700 in the second region 320. As a result, the arrangement target page screen 300 containing the PTT widget execution information 700 in the second region 320 is displayed in the display region 2a.

When determining in step s3 that the first to fifth page screens 300 do not include a page screen 300 having empty space, the display controller 100b adds a new page screen to the home screen and defines this new page screen as the arrangement target page screen 300 in step s6. In this example, a sixth page screen 300 is added to the home screen and is defined as the arrangement target page screen 300. Next, in step s4, the display controller 100b generates an arrangement target page screen 300 containing the PTT widget execution information 700 in the second region 320 (here, sixth page screen 300). Next, in step S5, the display controller 100b makes the display panel 120 display the arrangement target page screen 300 containing the PTT widget execution information 700 in the second region 320.

As described above, in response to operation on the home key 5a, the first page screen 300 is displayed first in the display region 2a in principle. However, when the home key 5a is operated while the PTT conversation screen 500 is displayed, regardless of whether the arrangement target page screen 300 is the first page screen 300 or not, the arrangement target page screen 300 containing the PTT widget execution information 700 in the second region 320 is displayed in the display region 2a by way of exception.

When the PTT conversation screen 500 is displayed in the display region 2a after the page screen 300 containing the PTT widget execution information 700 is displayed and the home key 5a is operated thereafter, the page screen 300 containing the PTT widget execution information 700 is displayed first out of the multiple page screens 300 forming the home screen.

Information (application icon 250 or different widget execution information) other than the PTT widget execution information 700 can be arranged in the second region 320 of the sixth page screen 300 added to the home screen.

In the aforementioned one example, the PTT widget is executed after the home key 5a is operated during the course of PTT conversation. Alternatively, the PTT widget may be executed when the PTT conversation is started. In this case, step s3 is executed after the home key 5a is operated in step s1, and the same subsequent processing is performed in the electronic device 1.

As described above, determining whether the multiple page screens 300 forming the home screen include a page screen 300 having empty space can prevent failing to arrange the PTT widget execution information 700 on the page screen 300.

Adding a new page screen 300 to the home screen in the absence of a page screen 300 having empty space out of the multiple page screens 300 forming the home screen can prevent failing to arrange the PTT widget execution information 700 further.

<Termination Process of PTT Conversation>

Figure 18:
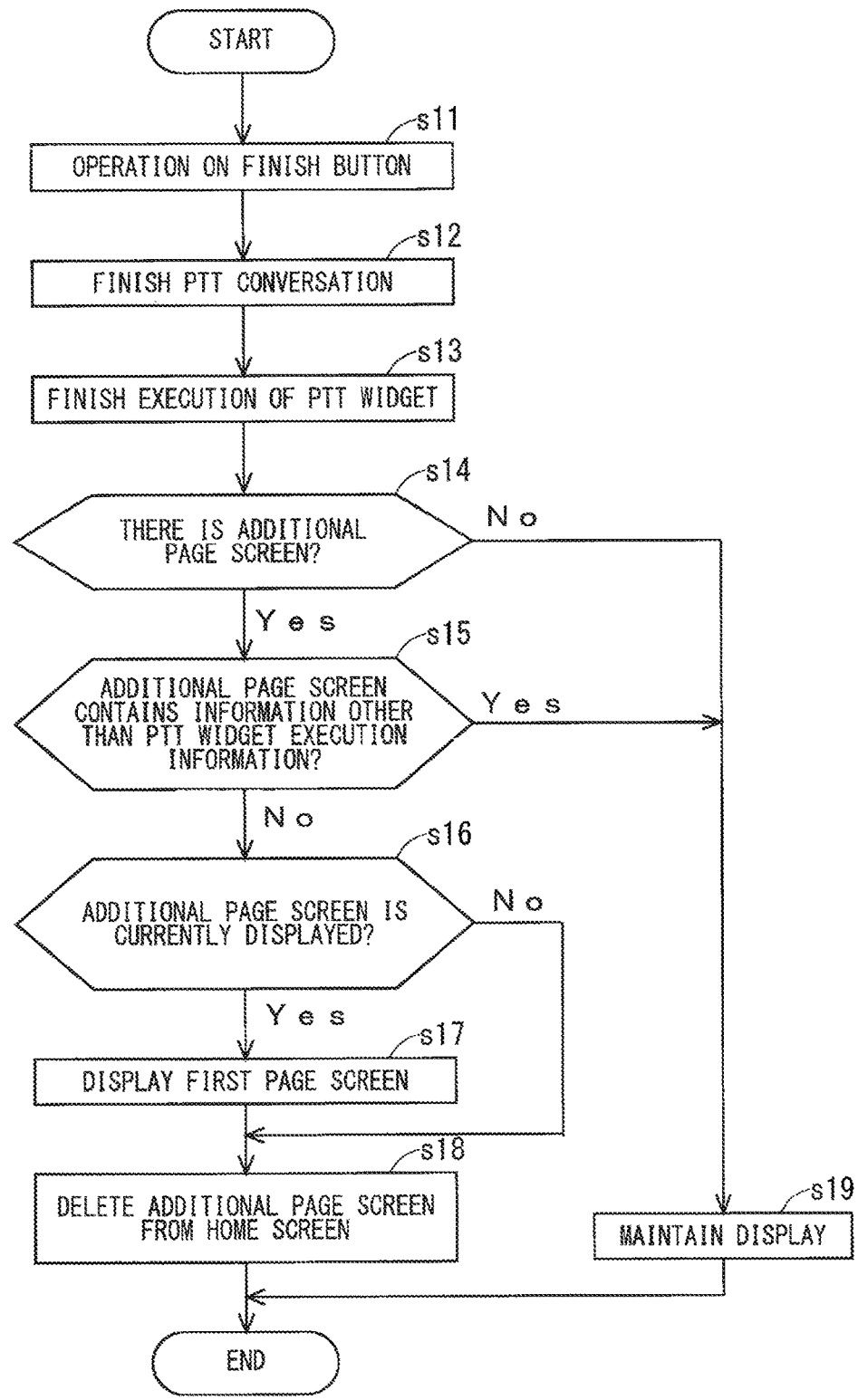
FIG. 18 illustrates a flowchart showing the behavior of the electronic device.

FIG. 18 is a flowchart showing how the electronic device 1 behaves at the time when PTT conversation is finished. As shown in FIG. 18, when the detecting module 150 detects operation on the finish button 531 of the PTT conversation screen 500 in step s11, the electronic device 1 finishes PTT conversation in step s12. Then, in step s13, the executing module 100a finishes executing the PTT widget. This makes the PTT widget execution information 700 disappear.

Next, in step s14, the display controller 100b determines whether there is a page screen 300 (in this example, sixth page screen 300) added to the home screen for displaying the PTT widget execution information 700 on this page screen 300. When determining in step s14 that there is no additional page screen 300, the display controller 100b maintains current display on the display panel 120 in step s19. Meanwhile, when determining in step s14 that there is an additional page screen 300, the display controller 100b determines in step s15 whether the additional page screen 300 contains information other than the PTT widget execution information 700 such as an application icon 250.

When determining in step s15 that the additional page screen 300 contains information other than the PTT widget execution information 700, the display controller 100b executes step s19 described above. As a result, the additional page screen 300 remains as the home screen. Meanwhile, when determining in step s15 that the additional page screen 300 does not contain information other than the PTT widget execution information 700, the display controller 100b determines in step s16 whether the additional page screen 300 is currently displayed on the display panel 120.

When determining in step s16 that the additional page screen 300 is not displayed on the display panel 120, the display controller 100b deletes the additional page screen 300 from the home screen in step s18. As a result, the additional page screen 300 will not appear afterward. Meanwhile, when determining in step s16 that the additional page screen 300 is displayed on the display panel 120, the display controller 100b switches display on the display panel 120 from the additional page screen 300 to the first page screen 300 in step s17. Then, the display controller 100b executes step s18 to delete the additional page screen 300 from the home screen. As a result, the additional page screen 300 will not appear afterward.

As described above, in this embodiment, a page screen 300 added to the home screen for displaying the PTT widget execution information 700 on this page screen 300 is deleted when PTT conversation is finished. This can prevent a useless page screen 300 from remaining as the home screen.

As described above, in the electronic device 1 of this embodiment, the PTT widget is executed during the course of PTT conversation. While a display screen different from the PTT conversation screen 500 is displayed, information on the PTT conversation screen 500 is incorporated into this different display screen. Thus, even if a display screen different from the PTT conversation screen 500 is displayed, a user can still check information about PTT conversation on the PTT conversation screen 500. This can prevent the user from failing to check information about PTT conversation currently made.

In this embodiment, execution of the PTT widget is finished when PTT conversation is finished. Thus, PTT widget execution information will not be displayed after the PTT conversation is finished. This can prevent information about PTT conversation from remaining displayed after this PTT conversation is finished.

In a part of the display region 2a where the PTT widget execution information 700 is to be displayed, a setting button like the setting button 534 on the PTT conversation screen 500 may be displayed. This setting button is to determine whether a communication function adopting Bluetooth (registered trademark) is to be used for PTT conversation.

<Various Modifications>

<First Modification>

In the aforementioned one example, when the first to fifth page screens 300 do not include a page screen 300 having empty space, the display controller 100b adds a new page screen 300 to the home screen. Alternatively, a new page screen 300 may be added to the home screen regardless of whether the first to fifth page screens 300 include a page screen 300 having empty space. Specifically, after step s2 is executed, the display controller 100b may bypass step s3 and proceed to step s5. Thus, in this case, the PTT widget execution information 700 is always incorporated into a page screen 300 added to the home screen.

<Second Modification>

In the aforementioned one example, when the home key 5a is operated while the PTT conversation screen 500 is displayed, the page screen 300 containing the PTT widget execution information 700 is displayed by way of exception. Alternatively, regardless of whether the first page screen 300 contains the PTT widget execution information 700, the first page screen 300 may be displayed according to principles in this case.

<Third Modification>

While a page screen 300 (hereinafter called a "non-target page screen 300" in this modification) other than a page screen 300 (hereinafter called a "target page screen 300" in this modification) containing the PTT widget execution information 700 is displayed, specifying information 750 may be displayed that specifies the page screen 300 containing the PTT widget execution information 700 out of the multiple page screens 300 forming the home screen.

Figure 19:
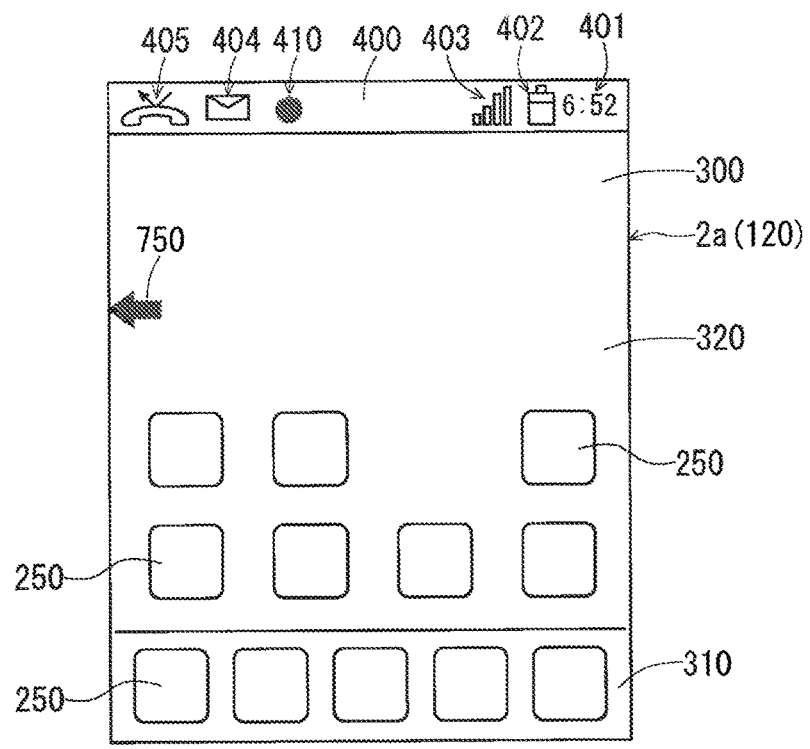
FIG. 19 illustrates an exemplary display screen displayed on the electronic device.
Figure 20:
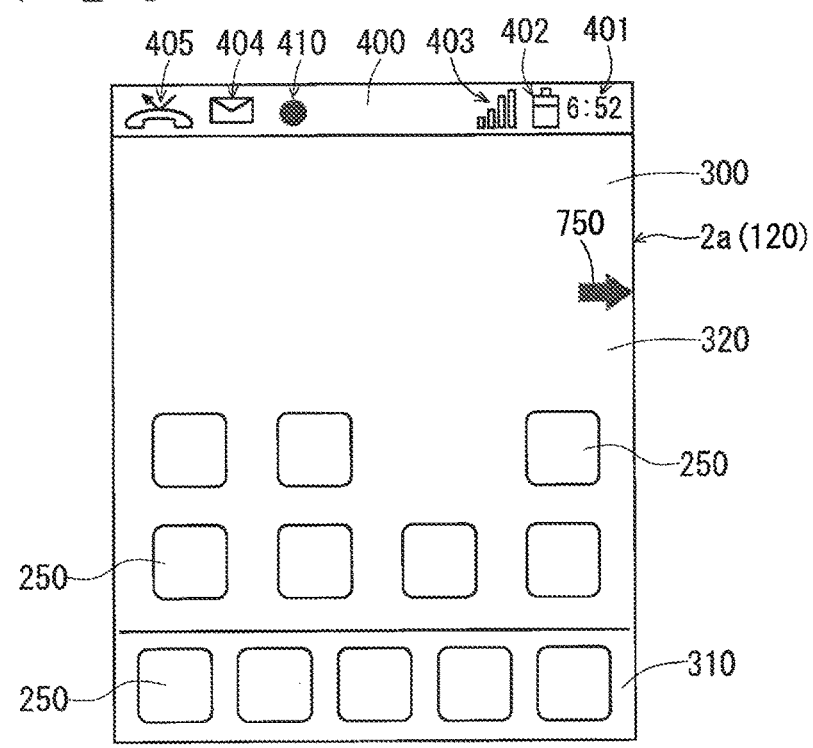
FIG. 20 illustrates an exemplary display screen displayed on the electronic device.

FIGS. 19 and 20 show examples of display of the specifying information 750 in the non-target page screen 300. In the examples of FIGS. 19 and 20, the specifying information 750 is indicated by arrows. FIG. 19 shows the specifying information 750 (left-pointing arrow) displayed in the presence of the target page screen 300 on the left side of the non-target page screen 300 displayed in the display region 2*a*. FIG. 20 shows the specifying information 750 (right-pointing arrow) displayed in the presence of the target page screen 300 on the right side of the non-target page screen 300 displayed in the display region 2*a*.

As shown in FIG. 19, while the left-pointing arrow is displayed as the specifying information 750 on the non-target page screen 300, a user who wishes to check the PTT widget execution information 700 performs the slide operation or the flick operation on the display region 2*a* to the right to turn to a left page screen 300 to be displayed in the display region 2*a*. When the target page screen 300 appears in the display region 2*a*, the user finishes the slide operation or the flick operation and checks the PTT widget execution information 700 on the target page screen 300.

As shown in FIG. 20, while the right-pointing arrow is displayed as the specifying information 750 on the non-target page screen 300, a user who wishes to check the PTT widget execution information 700 performs the slide operation or the flick operation on the display region 2*a* to the left to turn to a right page screen 300 to be displayed in the display region 2*a*. When the target page screen 300 appears in the display region 2*a*, the user finishes the slide operation or the flick operation and checks the PTT widget execution information 700 on the target page screen 300.

The target page screen 300 may also be displayed in the display region 2*a* in response to the touch operation on an arrow shown as the specifying information 750 on the non-target page screen 300. This does not require repeating the slide operation until the target page screen 300 appears, so that the target page screen 300 can be displayed by simple operation.

The specifying information 750 may be an object other than an arrow. As an example, the specifying information 750 may be a character string for specifying the target page screen 300. As a specific example, when a page screen 300 on the left side of the non-target page screen 300 displayed in the display region 2*a* is the target page screen 300, a character string such as "on the left side" is shown as the specifying information 750 on this non-target page screen 300. When a page screen 300 on the right side of the non-target page screen 300 displayed in the display region 2*a* is the target page screen 300, a character string such as "on the right side" is shown as the specifying information 750 on this non-target page screen 300.

The specifying information 750 may be information indicating the number of times the slide operation should be performed to reach the target page screen 300 from the non-target page screen 300 currently displayed. The information indicating the number of times the slide operation should be performed to reach the target page screen 300 from the non-target page screen 300 currently displayed may be shown as arrows of a number same as the number of times the slide operations should be performed. When a page screen 300 next but one on the right side of the non-target page screen 300 currently displayed is the target page screen 300, for example, two right-pointing arrows are shown in the non-target page screen 300 currently displayed. This allows a user to easily recognize the location of the target page screen 300 intuitively.

As described above, the specifying information 750 to specify the target page screen 300 out of the multiple page screens 300 forming the home screen is shown in the non-target page screen 300 displayed in the display region 2*a*. This allows a user to check the PTT widget execution information 700 easily.

<Fourth Modification>

When the multiple page screens 300 forming the home screen do not include a page screen 300 having empty space, a display size of the PTT widget execution information 700 may be reduced without adding a new page screen 300 to the home screen.

When determining in step s3 mentioned above that the multiple page screens 300 forming the home screen do not include a page screen 300 having empty space available for arrangement of the PTT widget execution information 700 of a size 2×4, the display controller 100*b* does not execute step s5. Instead, the display controller 100*b* determines whether these multiple page screens 300 include a page screen 300 (hereinafter called a "page screen 300 available for information arrangement") having a region (hereinafter called a "region without information") in the second region 320 where information is not present. As an example, the display controller 100*b* checks the first to fifth page screens 300 in the order named to determine whether these page screens 300 have a region without information in their second regions 320. Then, the display controller 100*b* defines a page screen 300 available for information arrangement out of the first to fifth page screens 300 as an arrangement target page screen 300 having been determined first to have the region without information in the second region 320. When the third and fifth page screens 300 each have a region without information in the second region 320, for example, the third page screen 300 is defined as the arrangement target page screen 300. When the arrangement target page screen 300 is decided, the display controller 100*b* reduces a display size of the PTT widget execution information 700 so as to allow arrangement of the PTT widget execution information 700 in the region without information in the second region 320 of this arrangement target page screen 300. Then, the display controller 100*b* arranges the PTT widget execution information 700 in this region without information. When the size of the region without information in the second region 320 of the arrangement target page screen 300 is 1×4, for example, the display size of the PTT widget execution information 700 is changed from 2×4 to 1×4, for example. Then, the PTT widget execution information 700 of a size 1×4 is displayed in this region without information. When the size of the region without information in the second region 320 of the arrangement target page screen 300 is 1×1, the display size of the PTT widget execution information 700 is changed from 2×4 to 1×1. Then, the PTT widget execution information 700 of a size 1×1 is displayed in this region without information.

As described above, in this modification, when a page screen 300 does not have empty space available for arrangement of the PTT widget execution information 700 of a size 2×4, the PTT widget execution information 700 of a display size smaller than a size 2×4 is incorporated into this page screen 300. This can prevent failing to arrange the PTT widget execution information 700 on the page screen 300 further.

The display controller 100*b* may also decide the arrangement target page screen 300 as follows.

First, the display controller 100*b* determines whether the first page screen 300 has empty space in the second region 320 available for arrangement of the PTT widget execution information 700 of a size 2×4. When the second region 320 of the first page screen 300 has such empty space, the display controller 100*b* defines the first page screen 300 as the arrangement target page screen 300. When the second region 320 of the first page screen 300 does not have such empty space, the display controller 100b determines whether the second region 320 of the first page screen 300 has a region without information. When the second region 320 of the first page screen 300 has a region without information, specifically when the first page screen 300 is the page screen 300 available for information arrangement, the display controller 100b defines the first page screen 300 as the arrangement target page screen 300. The display controller 100b arranges the PTT widget execution information 700 of a display size reduced to be smaller than a size 2×4 in the region without information in the second region 320 of the arrangement target page screen 300.

When the first page screen 300 is not the page screen 300 available for information arrangement, the display controller 100b determines whether the second page screen 300 has empty space available for arrangement of the PTT widget execution information 700 of a size 2×4. When the second region 320 of the second page screen 300 has such empty space, the display controller 100b defines the second page screen 300 as the arrangement target page screen 300. When the second region 320 of the second page screen 300 does not have such empty space, the display controller 100b determines whether the second region 320 of the second page screen 300 has a region without information. When the second page screen 300 is the page screen 300 available for information arrangement, the display controller 100b defines the second page screen 300 as the arrangement target page screen 300. The display controller 100b arranges the PTT widget execution information 700 of a display size reduced to be smaller than a size 2×4 in the region without information in the second region 320 of the arrangement target page screen 300.

When the second page screen 300 is not the page screen 300 available for information arrangement, the display controller 100b determines whether the third page screen 300 has empty space available for arrangement of the PTT widget execution information 700 of a size 2×4. The display controller 100b behaves in the same manner for subsequent process.

When the multiple page screens 300 forming the home screen do not include the page screen 300 available for information arrangement, a new page screen 300 may be added to the home screen and the PTT widget execution information 700 may be arranged on this new page screen 300.

<Fifth Modification>

Push to talk conversation is given as an example in the foregoing description. The foregoing description is further applicable to execution of a different function.

In the electronic device 1, when the television application is executed and recording of a television program is started, for example, a television recording screen containing information about the recording is displayed. While the television program is recorded, the electronic device 1 executes a widget for displaying information on the television recording screen (hereinafter called a "television widget"). As a result, while a display screen different from the television recording screen is displayed, information on this television recording screen is incorporated into a partial region of this different display screen.

In the electronic device 1, when the music reproduction control application is executed and reproduction control of music data is started, a music reproduction control screen containing information about the reproduction control is displayed. During the course of the reproduction control of music data, the electronic device 1 executes a widget for displaying information on the music reproduction control screen (hereinafter called a "music widget"). As a result, while a display screen different from the music reproduction control screen is displayed, information on this music reproduction control screen is incorporated into a partial region of this different display screen.

In the electronic device 1, when the access point application is executed and execution of an access point function for making the electronic device 1 function as an access point of a wireless LAN is started, an access point execution screen containing information about the execution is displayed. While the access point function is executed, the electronic device 1 executes a widget for displaying information on the access point execution screen (hereinafter called an "access point widget"). As a result, while a display screen different from the access point execution screen is displayed, information on this access point execution screen is incorporated into a partial region of this different display screen.

In the electronic device 1, when the wireless LAN application is executed and execution of a wireless LAN function for making the electronic device 1 communicate via an access point of a wireless LAN is started, a wireless LAN execution screen containing information about the execution is displayed. While the wireless LAN function is executed, the electronic device 1 executes a widget for displaying information on the wireless LAN execution screen (hereinafter called a "wireless LAN widget"). As a result, while a display screen different from the wireless LAN execution screen is displayed, information on this wireless LAN execution screen is incorporated into a partial region of this different display screen.

Figure 21:
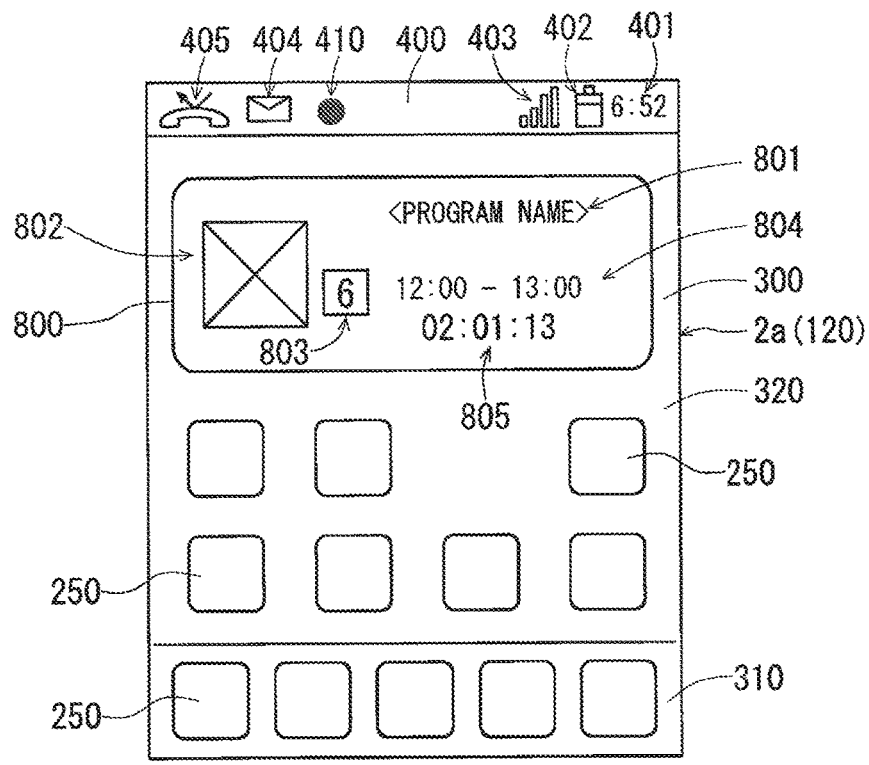
FIG. 21 illustrates an exemplary display screen displayed on the electronic device.
Figure 22:
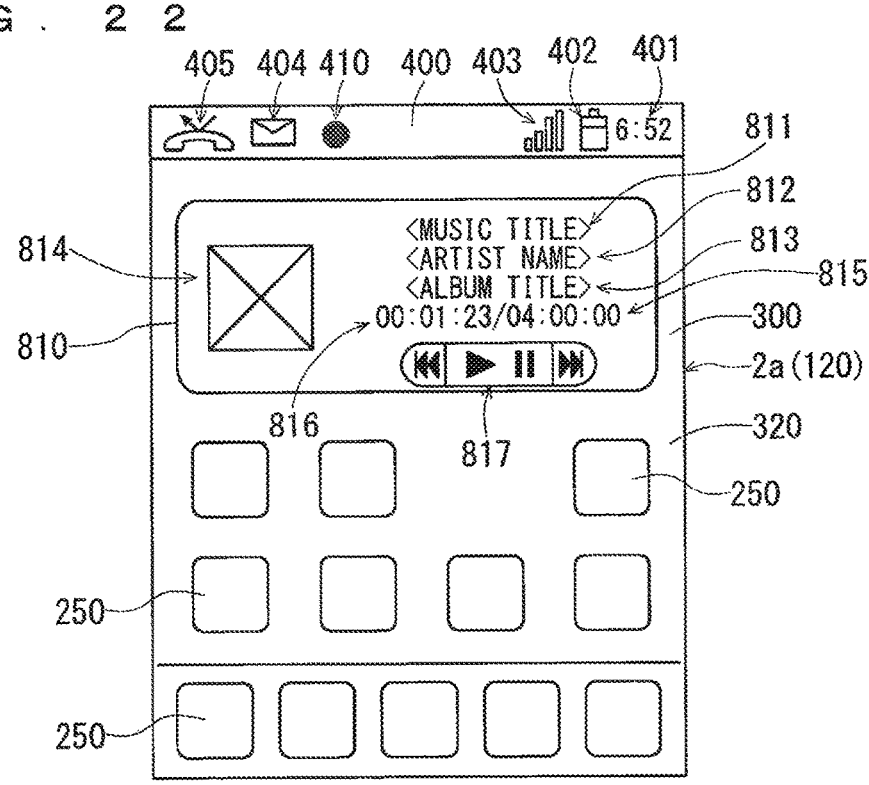
FIG. 22 illustrates an exemplary display screen displayed on the electronic device.
Figure 23:
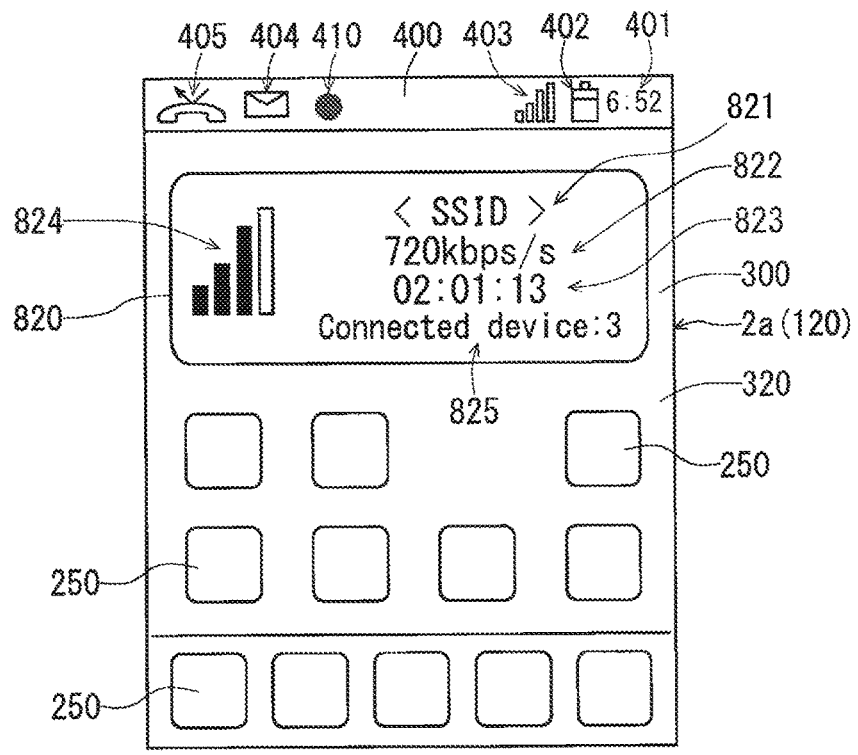
FIG. 23 illustrates an exemplary display screen displayed on the electronic device.
Figure 24:
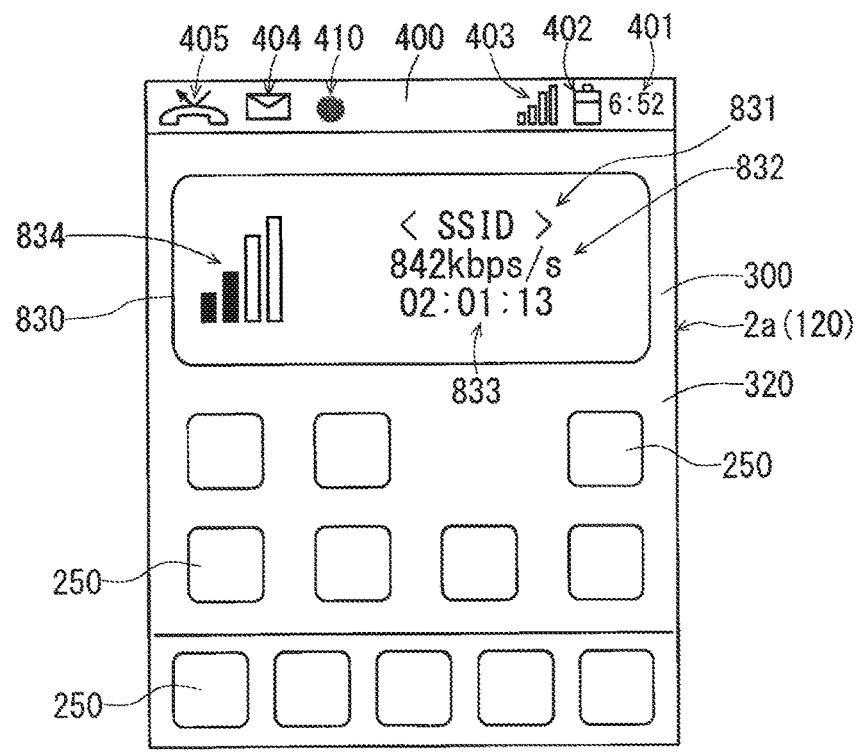
FIG. 24 illustrates an exemplary display screen displayed on the electronic device.

FIG. 21 shows television widget execution information 800 arranged on some page screen 300 of the home screen. FIG. 22 shows music widget execution information 810 arranged on some page screen 300 of the home screen. FIG. 23 shows access point widget execution information 820 arranged on some page screen 300 of the home screen. FIG. 24 shows wireless LAN widget execution information 830 arranged on some page screen 300 of the home screen.

The television widget execution information 800 includes information on the television recording screen. More specifically, as shown in FIG. 21, the television widget execution information 800 includes a name 801 of a recorded program, a thumbnail image 802 of the recorded program, and a channel 803 broadcasting the recorded program, for example. The television widget execution information 800 further includes an airtime 804 for the recorded program and a time 805 available for recording.

The music widget execution information 810 includes information on the music reproduction control screen. More specifically, as shown in FIG. 22, the music widget execution information 810 includes a title 811 of reproduced music (title of a reproduced music composition), an artist name 812 relating to the reproduced music, an album title 813 of the reproduced music, and a photograph image 814 of an album jacket of the reproduced music, for example. The music widget execution information 810 further includes a total reproduction time 815 of the reproduced music and a reproduction elapsed time 816 of the reproduced music. In the display region 2a, a music reproduction control button 817 appears in a part where the music widget execution information 810 is displayed. The access point widget execution information 820 includes information on the access point execution screen. More specifically, as shown in FIG. 23, the access point widget execution information 820 includes an SSID (service set identifier) 821 of the electronic device 1, a communication speed 822, and a remaining lifetime 823 of the battery 210, for example. The access point widget execution information 820 further includes an icon (FIG. 824 indicating the intensity of a radio wave transmitted from the electronic device 1, and the number 825 of devices connected to the electronic device 1 functioning as an access point.

The wireless LAN widget execution information 830 includes information on the wireless LAN execution screen. More specifically, as shown in FIG. 24, the wireless LAN widget execution information 830 includes an SSID 831 of an access point to which the electronic device 1 is connected, a communication speed 832, and a remaining lifetime 833 of the battery 210, for example. The wireless LAN widget execution information 830 further includes an icon (FIG. 834 indicating the intensity of a radio wave the electronic device 1 receives from the access point.

As described above, while a function different from PTT conversation is executed, a widget may also be executed. While a display screen different from an execution screen containing information about execution of this function is displayed, the information on this execution screen may be incorporated into a partial region of this different display screen. This can prevent a user from failing to check information about execution of a function different from PTT conversation while this different function is executed.

In the aforementioned one example, the present disclosure is applied to a mobile phone. Alternatively, the present disclosure is applicable to an electronic device other than a mobile phone.

While the electronic device 1 has been described in detail, the foregoing description is in all aspects illustrative and does not restrict the present disclosure. The various examples described above can be applied in combination as long as they do not contradict each other. It is understood that numerous modifications not illustrated can be devised without departing from the scope of the present disclosure.

The invention claimed is:

1. An electronic device comprising:
a display; and
at least one controller that,
in response to an initiation of an application, displays an application screen on the display, wherein the application screen comprises first information output by the application,
in response to an operation that changes the application screen to a home screen which comprises a plurality of pages, automatically adds a widget, comprising second information output by the application, to the home screen so as not to be superimposed on any existing information in the home screen by
determining whether or not at least one of the plurality of pages of the home screen comprises an empty space sufficient to fit the widget at a first size, and
when none of the plurality of pages of the home screen comprise the empty space sufficient to fit the widget at the first size, determine whether or not at least one of the plurality of pages of the home screen comprises an empty space sufficient to fit the widget at a second size that is smaller than the first size, and,
in response to termination of the application, automatically deletes the widget from the home screen.

2. The electronic device according to claim 1, wherein the application performs one of a communication using push to talk, a recording of a television program, a reproduction control of music data, making the electronic device function as an access point of a wireless local-area network (LAN), and making the electronic device communicate via an access point of a wireless LAN.

3. The electronic device according to claim 2, wherein the application performs a communication using push to talk, and the the second information includes at least one of information for specifying a communication partner, an image associated with the communication partner, a current condition of a floor in the communication, information for specifying a person currently having the floor in the communication, and a duration of the communication.

4. An electronic device comprising:
a display; and
at least one controller that,
in response to an initiation of an application, displays an application screen on the display, wherein the application screen comprises first information output by the application,
in response to an operation that changes the application screen to a home screen which comprises a plurality of pages, automatically adds a widget, comprising second information output by the application, to the home screen so as not to be superimposed on any existing information in the home screen by
determining whether or not at least one of the plurality of pages of the home screen comprises an empty space sufficient to fit the widget, and,
when at least one page of the home screen comprises the empty space sufficient to fit the widget, incorporates the widget into the empty space of the at least one page,
when one of the plurality of pages of the home screen, other than the at least one page into which the widget is incorporated, is displayed, incorporates, into the displayed page, an indication of a position of the at least one page relative to the displayed page, and,
in response to termination of the application, automatically deletes the widget from the home screen.

5. The electronic device according to claim 4, wherein the at least one controller, when none of the plurality of pages of the home screen comprise the empty space sufficient to fit the widget, automatically adds a new page to the home screen and adds the widget to the new page.

6. The electronic device according to claim 5, wherein deleting the widget from the home screen comprises deleting the new page from the home screen.

7. The electronic device according to claim 4, wherein the at least one controller, in response to the operation that changes the application screen to the home screen, automatically changes the application screen to the at least one page of the home screen into which the widget was incorporated.

8. The electronic device according to claim 4, wherein the application performs one of a communication using push to talk, a recording of a television program, a reproduction control of music data, making the electronic device function as an access point of a wireless local-area network (LAN), and making the electronic device communicate via an access point of a wireless LAN.

9. The electronic device according to claim 8, wherein the application performs a communication using push to talk, and the second information includes at least one of information for specifying a communication partner, an image associated with the communication partner, a current condition of a floor in the communication, information for specifying a person currently having the floor in the communication, and a duration of the communication.

10. An electronic device comprising:
a display; and
at least one controller that,
in response to an initiation of an application, displays an application screen on the display, wherein the application screen comprises first information output by the application,
in response to an operation that changes the application screen to a home screen which comprises a plurality of pages, automatically adds a new page to the home screen, and automatically adds a widget, comprising second information output by the application, to the new page of the home screen so as not to be superimposed on any existing information in the home screen,
when one of the plurality of pages of the home screen, other than the new page into which the widget was added, is displayed, incorporates, into the displayed page, an indication of a position of the at least one page relative to the displayed page, and,
in response to termination of the application, automatically deletes the widget from the home screen.

11. The electronic device according to claim 10, wherein deleting the widget from the home screen comprises deleting the new page from the home screen.

12. The electronic device according to claim 10, wherein the at least one controller, in response to the operation that changes the application screen to the home screen, automatically changes the application screen to the at least one page of the home screen into which the widget was added.

13. The electronic device according to claim 10, wherein the application performs one of a communication using push to talk, a recording of a television program, a reproduction control of music data, making the electronic device function as an access point of a wireless local-area network (LAN), and making the electronic device communicate via an access point of a wireless LAN.

14. The electronic device according to claim 13, wherein the application performs a communication using push to talk, and the second information includes at least one of information for specifying a communication partner, an image associated with the communication partner, a current condition of a floor in the communication, information for specifying a person currently having the floor in the communication, and a duration of the communication.

* * * * *